United States Patent
Sakamoto

(10) Patent No.: US 11,466,179 B2
(45) Date of Patent: Oct. 11, 2022

(54) POLYESTER PRESSURE-SENSITIVE ADHESIVE COMPOSITION, POLYESTER PRESSURE-SENSITIVE ADHESIVE, PRESSURE-SENSITIVE ADHESIVE SHEET AND OPTICAL MEMBER WITH PRESSURE-SENSITIVE ADHESIVE LAYER

(71) Applicant: Mitsubishi Chemical Corporation, Tokyo (JP)

(72) Inventor: Kento Sakamoto, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 110 days.

(21) Appl. No.: 16/820,821

(22) Filed: Mar. 17, 2020

(65) Prior Publication Data

US 2020/0216720 A1    Jul. 9, 2020

Related U.S. Application Data

(63) Continuation of application No. PCT/JP2018/037517, filed on Oct. 9, 2018.

(30) Foreign Application Priority Data

Oct. 12, 2017 (JP) ............................. JP2017-198821
Sep. 5, 2018 (JP) ............................. JP2018-166162

(51) Int. Cl.
| | | |
|---|---|---|
| *C09J 7/38* | (2018.01) | |
| *C09J 7/10* | (2018.01) | |
| *B32B 5/18* | (2006.01) | |
| *B32B 7/12* | (2006.01) | |
| *B32B 27/08* | (2006.01) | |
| *B32B 27/30* | (2006.01) | |
| *B32B 27/36* | (2006.01) | |
| *C08G 63/20* | (2006.01) | |

(52) U.S. Cl.
CPC ........ *C09J 7/38* (2018.01); *B32B 5/18* (2013.01); *B32B 7/12* (2013.01); *B32B 27/08* (2013.01); *B32B 27/308* (2013.01); *B32B 27/36* (2013.01); *B32B 27/365* (2013.01); *C08G 63/20* (2013.01); *C09J 7/10* (2018.01); *B32B 2250/24* (2013.01); *B32B 2266/0242* (2013.01)

(58) Field of Classification Search
CPC .. C09J 2423/00; C09J 2467/00; C09J 167/00; C09J 2203/318; C09J 7/10; C09J 7/38; B32B 15/043; B32B 15/082; B32B 15/085; B32B 15/088; B32B 15/09; B32B 15/12; B32B 15/14; B32B 15/18; B32B 15/20; B32B 2250/24; B32B 2262/101; B32B 2266/0242; B32B 2307/412; B32B 2307/748; B32B 23/04; B32B 23/042; B32B 23/06; B32B 23/08; B32B 23/10; B32B 23/20; B32B 2405/00; B32B 2457/20; B32B 2551/00; B32B 27/08; B32B 27/10; B32B 27/12; B32B 27/281; B32B 27/302; B32B 27/304; B32B 27/306; B32B 27/308; B32B 27/32; B32B 27/325; B32B 27/34; B32B 27/36; B32B 27/365; B32B 29/005; B32B 29/02; B32B 5/022; B32B 5/024; B32B 5/18; B32B 5/26; B32B 7/06; B32B 7/12; C08G 63/16; C08G 63/20

See application file for complete search history.

(56) References Cited

U.S. PATENT DOCUMENTS

2016/0312073 A1    10/2016    Yoshida et al.

FOREIGN PATENT DOCUMENTS

| CN | 1910248 A | 2/2007 |
|---|---|---|
| JP | S61-007370 A | 1/1986 |
| JP | 62-218444 A | 9/1987 |
| JP | 03-167284 A | 7/1991 |
| JP | 03-239779 A | 10/1991 |
| JP | H9-302047 A | 11/1997 |
| JP | 10-081814 A | 3/1998 |
| JP | 10-095908 A | 4/1998 |
| JP | 2007-270050 A | 10/2007 |
| JP | 2009-209279 A | 9/2009 |
| JP | 2015-134906 A | 7/2015 |
| JP | 2018-193537 A | 12/2018 |
| WO | 2005-078035 A | 8/2005 |

OTHER PUBLICATIONS

ISR issued in WIPO Patent Application No. PCT/JP2018/037517, dated Dec. 25, 2018, English translation.
IPRP issued in WIPO Patent Application No. PCT/JP2018/037517, dated Apr. 14, 2020, English translation.
EERR isued in EP Patent Application No. 18866563.2, dated Oct. 29, 2020.
Office Action issued in Chinese Patent Application No. 201880057924.1, dated May 27, 2021, English translation.
Office Action issued in TW Patent Application No. 107135479, dated Jan. 4, 2022, translation.
Office Action issued in CN Patent Application No. 201880057924.1, dated Mar. 3, 2022, translation.
Office Action issued in JP Patent Application No. 2018190593, dated Mar. 22, 2022, translation.

*Primary Examiner* — Frances Tischler

(74) *Attorney, Agent, or Firm* — Greenblum & Bernstein, P.L.C.

(57) ABSTRACT

A polyester pressure-sensitive adhesive composition is provided including a polyester resin having a predetermined amount of a structural unit derived from a hydrogenated polybutadiene structure-containing compound, or a polyester resin having a structural unit derived from a hydrogenated polybutadiene structure-containing compound and a predetermined amount of a structural unit derived from an aromatic ring structure-containing compound. The polyester pressure-sensitive adhesive composition has superior adhesion to a polyolefin base material and is highly transparency.

14 Claims, No Drawings

POLYESTER PRESSURE-SENSITIVE ADHESIVE COMPOSITION, POLYESTER PRESSURE-SENSITIVE ADHESIVE, PRESSURE-SENSITIVE ADHESIVE SHEET AND OPTICAL MEMBER WITH PRESSURE-SENSITIVE ADHESIVE LAYER

RELATED APPLICATION

This application is a continuation of International Application No. PCT/JP2018/037517, filed on Oct. 9, 2018, which claims priority to Japanese Patent Application No. 2017-198821 and 2018-166162, filed on Oct. 12, 2017 and Sep. 5, 2018 respectively, the entire contents of each of which being hereby incorporated by reference.

TECHNICAL FIELD

The present disclosure relates to a polyester pressure-sensitive adhesive composition, a polyester pressure-sensitive adhesive, a pressure-sensitive adhesive sheet, and an optical member with a pressure-sensitive adhesive layer, and more specifically, to a polyester pressure-sensitive adhesive composition, a polyester pressure-sensitive adhesive, a pressure-sensitive adhesive sheet, and an optical member with a pressure-sensitive adhesive layer each of which is excellent in adhesive property with a polyolefin base material and is also excellent in transparency.

BACKGROUND ART

A polyester resin is excellent in heat resistance, chemical resistance, durability, and mechanical strength, and hence has heretofore been used in a wide variety of applications including a film, a plastic bottle, a fiber, toner, an electrical part, and an adhesive and a pressure-sensitive adhesive.

In addition, in recent years, a display apparatus, such as a liquid crystal display (LCD), and an input apparatus to be used in combination with the display apparatus, such as a touch panel, have started to be widely used, and in the production of any such apparatus, a transparent pressure-sensitive adhesive sheet has been used in the bonding of an optical member, such as an optical film or a base material.

Further, the pressure-sensitive adhesive sheet has been used as a joining material in various industrial fields, such as a household electric appliance, a building material, and automobile exterior and interior materials, and hence has been required to be bonded with high reliability to various adherends including: metal materials, such as stainless steel and aluminum; various plastic materials, such as a polyethylene, a polypropylene, an ABS, and a polycarbonate resin; and glass materials.

As such pressure-sensitive adhesive sheet, for example, there has been proposed a pressure-sensitive adhesive sheet that achieves both of a pressure-sensitive adhesive property (adhesive property) at the time of its bonding to a metal plate and cohesiveness through the use of a film with a pressure-sensitive adhesive using a polyester pressure-sensitive adhesive composition having a hydrogenated polybutadiene skeleton (see, for example, PTL 1).

RELATED ART DOCUMENT

Patent Document

PTL 1: JP-A-HEI3 (1991)-167284

SUMMARY

In PTL 1 described above, the adhesive property with the metal plate is obtained. However, there is no consideration of an adhesive property with a polyolefin base material that is generally poor in adhesive property. In addition the pressure-sensitive adhesive sheet has not been satisfactory in terms of transparency.

Further, in recent years, the number of applications where the polyolefin base material is used as an adherend, for example, applications such as automobile interior and exterior materials, and a building material has been increasing, and hence there has been an extremely growing demand for an adhesive property with the polyolefin base material.

In view of the foregoing, under such background, the present disclosure provides a polyester pressure-sensitive adhesive composition, a polyester pressure-sensitive adhesive, a pressure-sensitive adhesive sheet, and an optical member with a pressure-sensitive adhesive layer each of which is excellent in adhesive property with a polyolefin base material and is also excellent in transparency.

To provide such products, the inventor has made extensive investigations in view of such circumstances, and as a result, has found that a polyester pressure-sensitive adhesive composition that is excellent in adhesive property with a polyolefin base material and is also excellent in transparency is obtained by incorporating a hydrogenated polybutadiene structure into a polyester resin and setting its content to a small value compared to a conventional value.

In addition, the inventor has found that a polyester pressure-sensitive adhesive composition that is excellent in adhesive property with a polyolefin base material and is also excellent in transparency is obtained by incorporating a hydrogenated polybutadiene structure and an aromatic ring structure into a polyester resin, and regulating the content of the aromatic ring structure to a predetermined amount.

That is, according to a first aspect of the present disclosure, there is provided a polyester pressure-sensitive adhesive composition, including a polyester resin having a structural unit derived from a hydrogenated polybutadiene structure-containing compound, wherein a content of the structural unit derived from the hydrogenated polybutadiene structure-containing compound is from 0.01 wt. % to 35 wt. % with respect to the polyester resin.

In addition, according to a second aspect of the present disclosure, there is provided a polyester pressure-sensitive adhesive composition, including a polyester resin having a structural unit derived from a hydrogenated polybutadiene structure-containing compound and a structural unit derived from an aromatic ring structure-containing compound, wherein a content of the structural unit derived from the aromatic ring structure-containing compound is from 0.01 wt. % to 35 wt. % with respect to the polyester resin.

In addition, according to a third aspect of the present disclosure, there is provided a polyester pressure-sensitive adhesive, which is obtained by crosslinking the polyester pressure-sensitive adhesive composition of the first or second aspect, and according to a fourth aspect of the present disclosure, there is provided a pressure-sensitive adhesive sheet, including a pressure-sensitive adhesive layer containing such polyester pressure-sensitive adhesive. Further, according to a fifth aspect of the present disclosure, there is provided an optical member with a pressure-sensitive adhesive layer, including a pressure-sensitive adhesive layer containing the polyester pressure-sensitive adhesive of the third aspect and an optical member.

In general, a possible method of improving the adhesive property of the polyester pressure-sensitive adhesive composition with a base material is to add a tackifier to control the cohesive force and interfacial adhesive property of the pressure-sensitive adhesive layer.

Further, when the composition is applied to a polyolefin base material that is generally poor in adhesive property, it is all the more typical to conceive an increase in content of the tackifier. However, when the tackifier is blended as described above, sufficient compatibility between the tackifier and the polyester resin is not obtained, and hence it becomes difficult to keep a balance between the pressure-sensitive adhesive characteristics of the composition owing to the white turbidness of the pressure-sensitive adhesive layer or a reduction in low-temperature tackiness thereof. Accordingly, the composition may be poor in adhesion reliability.

Another possible method of improving the adhesive property of the polyester pressure-sensitive adhesive composition with a base material is to incorporate a hydrogenated polybutadiene structure as described in the foregoing, and the incorporation of the hydrogenated polybutadiene structure exhibits an improving effect. However, a demand for an improvement in adhesive property has been further growing.

In view of the foregoing, in the present disclosure, it has been found that, when no tackifier is used, and the content of the hydrogenated polybutadiene structure in the polyester resin is unexpectedly set to a comparatively small value, the composition is excellent in adhesive property with a polyolefin base material, and is also excellent in haze (transparency) and solution transparency.

In addition, in the present disclosure, it has been found that, when no tackifier is used, and an aromatic ring structure is incorporated in a predetermines amount into the composition in addition to the incorporation of the hydrogenated polybutadiene structure, the composition is excellent in adhesive property with a polyolefin base material, and is also excellent in haze (transparency).

In general, a polyolefin base material has low polarity, and is hence poor in adhesive property. Accordingly, to cope with the problem, an attempt to improve the adhesive property is typically made by reducing the polarity of the polyester resin, and hence the incorporation of the aromatic ring structure having high polarity is hardly conceivable. However, it has been found that, when the aromatic ring structure is deliberately incorporated in a predetermined amount into the composition in addition to the hydrogenated polybutadiene structure, the composition is excellent in adhesive property with the polyolefin base material, and is also excellent in haze (transparency).

The polyester pressure-sensitive adhesive composition of the present disclosure is a polyester pressure-sensitive adhesive composition, including a polyester resin having a structural unit derived from a hydrogenated polybutadiene structure-containing compound, wherein a content of the structural unit derived from the hydrogenated polybutadiene structure-containing compound is from 0.01 wt. % to 35 wt. % with respect to the polyester resin. Accordingly, the composition is excellent in adhesive property with a polyolefin base material, and is also excellent in haze (transparency) and solution transparency.

Of the compositions of the present disclosure, in particular, the composition satisfying the following conditions can be superior in adhesive property with a polyolefin base material, and can also be excellent in haze (transparency) and solution transparency: the polyester resin has a structural unit derived from a polyvalent carboxylic acid (a1) and a structural unit derived from a polyol (a2); the hydrogenated polybutadiene structure-containing compound is a hydrogenated polybutadiene polyol in the polyol (a2); and the structural unit derived from the hydrogenated polybutadiene structure-containing compound is incorporated at from 0.001 mol % to 10 mol % into the structural unit derived from the polyol (a2).

Of the compositions of the present disclosure, in particular, the composition satisfying the following condition can be superior in adhesive property with a polyolefin base material, and can also be excellent in haze (transparency) and solution transparency: the polyvalent carboxylic acid (a1) includes an asymmetric aromatic polyvalent carboxylic acid.

Of the compositions of the present disclosure, in particular, the composition satisfying the following condition can be superior in adhesive property with a polyolefin base material: the polyvalent carboxylic acid (a1) includes an aliphatic polyvalent carboxylic acid having an odd number of carbon atoms.

Of the compositions of the present disclosure, in particular, the composition satisfying the following condition can be superior in adhesive property with a polyolefin base material: the polyol (a2) includes a branched structure-containing polyol.

Of the compositions of the present disclosure, in particular, the composition satisfying the following condition can be excellent in reactivity: the polyol (a2) includes a linear polyol.

The polyester pressure-sensitive adhesive composition of the present disclosure is a polyester pressure-sensitive adhesive composition, including a polyester resin having a structural unit derived from a hydrogenated polybutadiene structure-containing compound and a structural unit derived from an aromatic ring structure-containing compound, wherein a content of the structural unit derived from the aromatic ring structure-containing compound is from 0.01 wt. % to 35 wt. % with respect to the polyester resin. Accordingly, the composition is excellent in adhesive property with a polyolefin base material, and is also excellent in haze (transparency).

Of the compositions of the present disclosure, in particular, the composition satisfying the following conditions can be superior in adhesive property with a polyolefin base material, and can also be excellent in haze (transparency): the polyester resin has a structural unit derived from a polyvalent carboxylic acid (a1) and a structural unit derived from a polyol (a2); the aromatic ring structure-containing compound is an aromatic dicarboxylic acid in the polyvalent carboxylic acid (a1); and the structural unit derived from the aromatic ring structure-containing compound is incorporated at from 0.1 mol % to 70 mol % into the structural unit derived from the polyvalent carboxylic acid (a1).

In the present disclosure, in particular, when a content of the structural unit derived from the hydrogenated polybutadiene structure-containing compound is from 0.01 wt. % to 50 wt. % with respect to the polyester resin, the composition can be superior in adhesive property with a polyolefin base material.

In the present disclosure, in particular, the composition satisfying the following conditions can be superior in adhesive property with a polyolefin base material, and can also be excellent in haze (transparency) the polyester resin has the structural unit derived from the polyvalent carboxylic acid (a1) and the structural unit derived from the polyol (a2); the hydrogenated polybutadiene structure-containing compound is a hydrogenated polybutadiene polyol in the polyol (a2); and the structural unit derived from the hydrogenated polybutadiene structure-containing compound is incorporated at from 0.001 mol % to 15 mol % into the structural unit derived from the polyol (a2).

In the present disclosure, in particular, when the polyester resin has a glass transition temperature of from −80° C. to 20° C., the composition can be superior in pressure-sensitive adhesive physical property.

In the present disclosure, when the composition further includes a hydrolysis inhibitor, the composition can be excellent in long-term durability.

In the present disclosure, when the composition further includes a urethanization catalyst, the composition can be excellent in reaction rate.

In the present disclosure, when the composition further includes a crosslinking agent, the composition is excellent in cohesive force, and hence can be excellent as a pressure-sensitive adhesive.

The polyester pressure-sensitive adhesive, which is obtained by crosslinking the polyester pressure-sensitive adhesive composition of the present disclosure, is excellent in adhesive property with a polyolefin base material, and is also excel lent in haze (transparency).

The pressure-sensitive adhesive sheet, including the pressure-sensitive adhesive layer containing the polyester pressure-sensitive adhesive of the present disclosure, is excellent in adhesive property with a polyolefin base material, and is also excellent in haze (transparency).

The optical member with a pressure-sensitive adhesive layer, including the pressure-sensitive adhesive layer containing the polyester pressure-sensitive adhesive of the present disclosure, and the optical member, is excellent in adhesive property with a polyolefin base material, and is also excellent in haze (transparency).

DESCRIPTION OF EMBODIMENTS

The construction of the present disclosure is described in detail below. However, the following description describes example of a desired embodiment of the present disclosure.

In the present disclosure, the term "carboxylic acid" comprehends carboxylic acid derivatives, such as a carboxylic acid salt, a carboxylic acid anhydride, a carboxylic acid halide, and a carboxylic acid ester, in addition to a carboxylic acid.

A polyester pressure-sensitive adhesive composition of the present disclosure is characterized by including, as a polyester resin, at least one selected from the group consisting of: a polyester resin having a structural unit derived from a hydrogenated polybutadiene structure-containing compound in which the content of the structural unit derived from the hydrogenated polybutadiene structure-containing compound is from 0.01 wt. % to 35 wt. % with respect to the polyester resin (hereinafter referred to as "first polyester resin"); and a polyester resin having a structural unit derived from a hydrogenated polybutadiene structure-containing compound and a structural unit derived from an aromatic ring structure-containing compound in which the content of the structural unit derived from the aromatic ring structure-containing compound is from 0.01 wt. % to 35 wt. % with respect to the polyester resin (hereinafter referred to as "second polyester resin").

That is, the first polyester resin to be used in the polyester pressure-sensitive adhesive composition of the present disclosure is obtained by polymerizing and preparing the hydrogenated polybutadiene structure-containing compound so that the content of the structural unit derived from the hydrogenated polybutadiene structure-containing compound in the polyester resin may be from 0.01 wt. % to 35 wt. %.

In addition, the second polyester resin to be used in the polyester pressure-sensitive adhesive composition of the present disclosure is obtained by polymerizing and preparing the aromatic ring structure-containing compound so that the polyester resin may have the structural unit derived from the hydrogenated polybutadiene structure-containing compound and the structural unit derived from the aromatic ring structure-containing compound, and the content of the structural unit derived from the aromatic ring structure-containing compound in the polyester resin may be from 0.01 wt. % to 35 wt. %.

The respective components forming the polyester pressure-sensitive adhesive composition of the present disclosure are sequentially described below.

<Polyester Resin>

The first or second polyester resin is typically obtained by copolymerizing copolymerization components including a polyvalent carboxylic acid (a1) and a polyol (a2) as constituent raw materials, and the polyester resin has a structural unit derived from the polyvalent carboxylic acid (a1) and a structural unit derived from the polyol (a2) as its resin composition.

[Polyvalent Carboxylic Acid (a1)]

Examples of the polyvalent carboxylic acid (a1) to be used as a constituent raw material for the first or second polyester resin include a divalent carboxylic acid and a polyvalent carboxylic acid that is trivalent or more, and the divalent carboxylic acid is preferably used because the polyester resin is stably obtained.

Examples of the divalent carboxylic acid include:

aliphatic dicarboxylic acids, such as malonic acids, dimethylmalonic acids, succinic acids, glutaric acids, adipic acids, trimethyladipic acids, pimelic acids, 2,2-dimethylglutaric acids, azelaic acids, sebacic acids, fumaric acids, maleic acids, itaconic acids, thiodipropionic acids, diglycolic acids, and 1,9-nonanedicarboxylic acids;

aromatic dicarboxylic acids, such as phthalic acids, terephthalic acids, isophthalic acids, benzylmalonic acids, diphenic acids, 4,4'-oxydibenzoic acids, and naphthalenedicarboxylic acids, such as 1,8-naphthalenedicarboxylic acids, 2,3-naphthalenedicarboxylic acids, and 2,7-naphthalenedicarboxylic acids; and alicyclic dicarboxylic acids, such as 1,3-cyclopentanedicarboxylic acids, 1,2-cyclohexanedicarboxylic acids, 1,4-cyclohexanedicarboxylic acids, 2,5-norbornanedicarboxylic acids, and adamantanedicarboxylic acids.

Examples of the carboxylic acid that is trivalent or more include trimellitic acids, pyromellitic acids, adamantanetricarboxylic acids, and trimesic acids.

In addition, a hydrogenated polybutadiene structure-containing compound may be used as the polyvalent carboxylic acid (a1). Examples thereof include: polybutadiene polyvalent carboxylic acids, such as 1,2-polybutadienedicarboxylic acids, 1,4-polybutadienedicarboxylic acids, 1,2-polychloroprenedicarboxylic acids, and 1,4-polychloroprenedicarboxylic acids; chain polyethylene polyvalent carboxylic acids obtained by saturating double bonds of those polybutadiene polyvalent carboxyl c acids with hydrogen or a halogen; chlorinated polyethylene polyvalent carboxylic acids; and branched saturated hydrocarbon polyvalent carboxylic acids. Further, polyvalent carboxylic acids obtained by copolymerizing olefin compounds, such as styrene, ethylene, vinyl acetate, and an acrylic acid ester, with polybutadiene polyvalent carboxylic acids, and hydrogenated polyvalent carboxylic acids obtained by hydrogenating those polyvalent carboxylic acids may each be used. Of those, a hydrocarbon polybutadiene polyvalent carboxylic acid having a high degree of saturation, the acid having a number-average molecular weight of from 500 to 6,000, and an average functional number of carboxyl groups of from 1.5 to 3, is particularly preferred.

Of the polyvalent carboxylic acids (a1), an aromatic dicarboxylic acid is preferred because the acid is excellent in adhesive property with a polyolefin base material, and is also excellent in transparency. In addition, those polyvalent carboxylic acids (a1) may be used alone or in combination thereof.

Further, of the aromatic dicarboxylic acids, it is preferred to incorporate an asymmetric aromatic dicarboxylic acid because the crystallinity of the polyester resin is lowered. Examples of the asymmetric aromatic dicarboxylic acid include phthalic acids, isophthalic acids, 1,8-naphthalenedicarboxylic acids, 2,3-naphthalenedicarboxylic acids, and 2,7-naphthalenedicarboxylic acids. Of those, isophthalic acids are particularly preferred from the viewpoint of reactivity.

The content of an asymmetric aromatic polyvalent carboxylic acid in the case of the production of the first polyester resin is preferably from 1 mol % to 90 mol %, particularly preferably from 2 mol % to 80 mol %, further preferably from 3 mol % to 60 mol %, further particularly preferably from 5 mol % to 40 mol % with respect to the entirety of the polyvalent carboxylic acid (a1).

In addition, the content of an asymmetric aromatic dicarboxylic acid in the case of the production of the second polyester resin is preferably from 0.1 mol % to 70 mol %, particularly preferably from 0.2 mol % to 60 mol %, further preferably from 0.5 mol % to 50 mol %, further particularly preferably from 1 mol % to 40 mol %, more preferably from 3 mol % to 30 mol % with respect to the entirety of the polyvalent carboxylic acid (a1).

When the content of the asymmetric aromatic polyvalent carboxylic acid with respect to the entirety of the polyvalent carboxylic acid (a1) is excessively small, there is a tendency that the resin crystalizes, and hence sufficient pressure-sensitive adhesive performance is not obtained. When the content is excessively large, the compatibility and initial adhesiveness (tackiness) of the resin tend to reduce.

Further, out of the polyvalent carboxylic acids (a1), an aliphatic polyvalent carboxylic acid having an odd number of carbon atoms is preferably incorporated because the acid reduces the crystallinity of the polyester resin, and examples of the aliphatic polyvalent carboxylic acid having an odd number of carbon atoms include a malonic acid, a glutaric acid, a pimelic acid, an azelaic acid, and a 1,9-nonanedicarboxylic acid. Of those, an azelaic acid is particularly preferably used.

The content of such aliphatic polyvalent carboxylic acid having an odd number of carbon atoms is preferably from 5 mol % to 100 mol % with respect to the entirety of the polyvalent carboxylic acid (a1).

In particular, when emphasis is placed on solution transparency in the first polyester resin, the content of the aliphatic polyvalent carboxylic acid having an odd number of carbon atoms is preferably from 5 mol % to 100 mol %, particularly preferably from 10 mol % to 100 mol %, further preferably from 20 mol % to 100 mol %, further particularly preferably from 30 mol % to 100 mol % with respect to the entirety of the polyvalent carboxylic acid (a1). When such content is excessively small, there is a tendency that the resin crystallizes, and hence sufficient pressure-sensitive adhesive performance is not obtained.

In addition, when emphasis is placed on an adhesive property with a polyolefin base material in the first polyester resin, the content of the aliphatic polyvalent carboxylic acid having an odd number of carbon atoms is preferably from 5 mol % to 100 mol %, particularly preferably from 10 mol % to 95 mol %, further preferably from 20 mol % to 90 mol %, further particularly preferably from 30 mol % to 80 mol % with respect to the entirety of the polyvalent carboxylic acid (a1). When such content is excessively small, there is a tendency that the resin crystallizes, and hence sufficient pressure-sensitive adhesive performance is not obtained. When the content is excessively large, the adhesive property with a polyolefin base material tends to reduce.

Further, when emphasis is placed on solution transparency in the second polyester resin, the content of the aliphatic polyvalent carboxylic acid having an odd number of carbon atoms is preferably from 10 mol % to 95 mol %, particularly preferably from 20 mol % to 90 mol %, further preferably from 30 mol % to 80 mol % with respect to the entirety of the polyvalent carboxylic acid (a1). When such content is excessively small, there is a tendency that the resin crystallizes, and hence sufficient pressure-sensitive adhesive performance is not obtained. When the content is excessively large, the adhesive property with a polyolefin base material tends to reduce.

In the present disclosure, the asymmetric aromatic dicarboxylic acid and the aliphatic polyvalent carboxylic acid are also preferably used in combination as the polyvalent carboxylic acids in terms of pressure-sensitive adhesive physical property.

The content ratio (molar ratio) "asymmetric aromatic polyvalent carboxylic acid/aliphatic polyvalent carboxylic acid" between the asymmetric aromatic polyvalent carboxylic acid and the aliphatic polyvalent carboxylic acid in the case of the production of the first polyester resin is preferably from 0/100 to 70/30, particularly preferably from 5/95 to 50/50, further preferably from 10/90 to 30/70.

In addition, the content ratio (molar ratio) "asymmetric aromatic dicarboxylic acid/aliphatic polyvalent carboxylic acid" between the asymmetric aromatic dicarboxylic acid and the aliphatic polyvalent carboxylic acid in the case of the production of the second polyester resin is preferably from 0.1/99.9 to 70/30, particularly preferably from 0.2/99.8 to 60/40, further preferably from 0.5/99.5 to 50/50, further particularly preferably from 1/99 to 40/60, more preferably from 3/97 to 30/70.

A polyvalent carboxylic acid that is trivalent or more may be used for increasing the number of branch points in the polyester resin. Of such acids, trimellitic acids are preferably used because their gelation relatively hardly occurs.

The content of such polyvalent carboxylic acid that is Trivalent or more is preferably 10 mol % or less, particularly preferably from 0.1 mol % to 5 mol % with respect to the entirety of the polyvalent carboxylic acid (a1) because the cohesive force of a pressure-sensitive adhesive formed of the composition can be improved. When such content is excessively large, the gelation tends to be liable to occur at the time of the production of the polyester resin.

[Polyol (a2)]

Examples of the polyol (a2) to be used as a constituent raw material for the first and second polyester resins include a dihydric alcohol and a polyol that is trihydric or more. The polyols (a2) may be used alone or in combination thereof.

Examples of the dihydric alcohol include:

aliphatic diols, such as ethylene glycol, diethylene glycol, triethylene glycol, propylene glycol, dipropylene glycol, 1,3-propanediol, 2,4-dimethyl-2-ethylhexane-1,3-diol, 2-methyl-1,3-propanediol, 2,2-dimethyl-1,3-propanediol (neopentyl glycol), 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 3-methyl-1,5-pentanediol, and 2,2,4-trimethyl-1,6-hexanediol;

alicyclic diols, such as 1,2-cyclohexanedimethanol, 1,3-cyclohexanedimethanol, 1,4-cyclohexanedimethanol, spiroglycol, tricyclodecanedimethanol, adamantanediol, and 2,2,4,4-tetramethyl-1,3-cyclobutanediol; and aromatic diols, such as 4,4'-thiodiphenol, 4,4'-methylenediphenol, 4,4'-dihydroxybiphenyl, o-, m-, and p-dihydroxybenzenes, 2,5-naphthalenediol, p-xylenediol, and ethylene oxide adducts and propylene oxide adducts thereof.

Further, examples thereof also include fatty acid esters derived from castor oil, dimer diols derived from oleic acid, erucic acid, and the like, and glycerol monostearate.

In addition, examples of the polyol that is trihydric or more include pentaerythritol, dipentaerythritol, tripentaerythritol, glycerin, trimethylolpropane, trimethylolethane, 1,3,6-hexanetriol, and adamantanetriol.

In addition, a hydrogenated poi butadiene polyol may be used as the polyol (a2).

Examples of the hydrogenated polybutadiene polyol include: polybutadiene polyols, such as 1,2-polybutadiene polyol, 1,4-polybutadiene polyol, 1,2-polychloroprene polyol, and 1,4-polychloroprene polyol; chain polyethylene polyols obtained by saturating double bonds of those polybutadiene polyols with hydrogen or a halogen; chlorinated polyethylene polyols; and branched saturated hydrocarbon polyols. Further, polyols obtained by copolymerizing olefin compounds, such as styrene, ethylene, vinyl acetate, and an acrylic acid ester, with polybutadiene polyols, and hydrogenated polyols obtained by hydrogenating those polyols may each be used. Of those, a hydrocarbon polybutadiene polyol having a high degree of saturation, the polyol having a number-average molecular weight of from 500 to 6,000, and an average functional number of hydroxy groups of from 1.5 to 3, is particularly preferred.

Of the polyols (a2), the hydrogenated polybutadiene polyol is preferably used because of its excellent adhesive property with a polyolefin base material.

Further, in a 1,2 bonding moiety and a 1,4 bonding moiety in the structure of the hydrogenated polybutadiene polyol, the ratio of the 1,2 bonding moiety is preferably large because the polyol is excellent in adhesive property with a polyolefin base material. The ratio of the 1,2 bonding moiety in the hydrogenated polybutadiene polyol is preferably from 25% to 100%, particularly preferably from 50% to 100%, further particularly preferably from 75% to 100%.

The content of the hydrogenated polybutadiene polyol in the case of the production of the first polyester resin is preferably from 0.001 mol % to 10 mol %, further preferably from 0.01 mol % to 8 mol %, particularly preferably from 0.03 mol % to 5 mol %, further particularly preferably from 0.04 mol % to 3 mol %, more preferably from 0.05 mol % to 0.5 mol % with respect to the polyol (a2).

In addition, the content of the hydrogenated polybutadiene polyol in the case of the production of the second polyester resin is preferably from 0.001 mol % to 15 mol %, further preferably from 0.005 mol % to 10 mol %, particularly preferably from 0.01 mol % to 5 mol %, further particularly preferably from 0.05 mol % to 2 mol %, more preferably from 0.1 mol % to 1 mol % with respect to the polyol (a2).

When the content of the hydrogenated polybutadiene polyol with respect to the polyol (a2) is excessively small, the adhesive property with a polyolefin base material tends to reduce, and when the content is excessively large, the compatibility of the resin tends to reduce.

In addition, out of the polyols (a2), a branched structure-containing polyol is preferably incorporated because the incorporation increases the number of branch points of the resin to break the crystallinity thereof. Examples of the branched structure-containing polyol include neopentyl glycol, 2-methyl-1,3-propanediol, 2-methyl-2-ethyl-1,3-propanediol, 2,2-diethyl-1,3-propanediol, 2-methyl-2-propyl-1,3-propanediol, 2-butyl-2-ethyl-1,3-propanediol, 3-methyl-1,5-pentanediol, 2-methyl-2,4-pentanediol, 2,4-diethyl-1,5-pentanediol, 1,3,5-trimethyl-1,3-pentanediol, and 2-methyl-1,6-hexanediol. Of those, neopentyl glycol is particularly preferred.

The above-mentioned hydrogenated polybutadiene polyol is excluded from the branched structure-containing polyol.

The content of the structure-containing polyol is preferably from 5 mol % to 99 mol %, particularly preferably from 10 mol % to 98 mol %, further preferably from 30 mol % to 97 mol % with respect to the entirety of the polyol (a2). When such content is excessively small, there is a tendency that the resin crystallizes, and hence sufficient pressure-sensitive adhesive performance is hardly obtained. When the content is excessively large, a reaction time tends to be long in the production of the polyester resin.

In addition, meanwhile, out of the polyols (a2), a linear polyol is preferably incorporated in terms of reactivity, and a linear polyol having 2 to 40 carbon atoms is more preferably incorporated. Examples of such linear polyol include aliphatic glycols, such as ethylene glycol, 1,3-propanediol, 1,4-butanediol, 1,5-pentanediol, 1,6-hexanediol, diethylene glycol, dipropylene glycol, 1,9-nonanediol, 1,10-decanediol, and 1,12-dodecanediol. Of those, 1,4-butanediol is particularly preferred.

The content of the linear polyol in the case of the production of the first polyester resin is preferably from 1 mol % to 100 mol %, further preferably from 3 mol % to 99.999 mol %, particularly preferably from 5 mol % to 99.99 mol %, further particularly preferably from 7 mol % to 99.9 mol %, still further particularly preferably from 10 mol % to 99.5 mol % with respect to the entirety of the polyol (a2).

The content of the linear polyol in the case of the production of the second polyester resin is preferably from 3 mol % to 95 mol %, further preferably from 5 mol % to 90 mol %, particularly preferably from 10 mol % to 80 mol %, further particularly preferably from 15 mol % to 60 mol % with respect to the entirety of the polyol (a2).

When the content of the linear polyol with respect to the entirety of the polyol (a2) is excessively small, stable resin formation tends to be hardly performed.

In addition, a polyol that is trihydric or more may be used for increasing the number of branch points in the polyester resin. Examples of the polyol that is trihydric or more include pentaerythritol, dipentaerythritol tripentaerythritol, glycerin, trimethylolpropane, trimethylolethane, 1,3,6-hexanetriol, and adamantanetriol. Those polyols may be used alone or in combination thereof.

The content of such polyol that is trihydric or more is preferably 20 mol % or less, further preferably from 0.1 mol % to 10 mol %, particularly preferably from 0.5 mol % to 5 mol % with respect to the entirety of the polyol (a2). When such content is excessively large, it tends to be difficult to produce the polyester resin.

The polyester resin to be used in the present disclosure is produced by: arbitrarily selecting the polyvalent carboxylic acid (a1) and the polyol (a2); and subjecting the materials to a polycondensation reaction in the presence of a catalyst by a known method. The resin needs to have, in its structure, a predetermined amount of the structural unit derived from the hydrogenated polybutadiene structure-containing compound, or the structural unit derived from the hydrogenated polybutadiene structure-containing compound and a predetermined amount of the structural unit derived from the aromatic ring structure-containing compound.

With regard to a blending ratio between the polyvalent carboxylic acid (a1) and the polyol (a2) in the polycondensation reaction, the polyol (a2) is blended in an amount of preferably from 1 equivalent to 3 equivalents, particularly preferably from 1.1 equivalents to 2 equivalents per 1 equivalent of the polyvalent carboxylic acid (a1). When the blending ratio of the polyol (a2) is excessively small, the acid value of the mixture of the materials tends to increase to make it difficult to polymerize the mixture, and when the ratio is excessively large, the yield of the resin tends to reduce.

At the time of the polycondensation reaction, an esterification reaction is performed first, and then the polycondensation reaction is performed.

In such esterification reaction, a catalyst is typically used. Specific examples of the catalyst may include: catalysts including titanium, catalysts, such as tetraisopropyl titanate and tetrabutyl titanate, antimony catalysts, such as antimony trioxide, and germanium catalysts, such as germanium dioxide; and catalysts including zinc acetate, manganese acetate, and dibutyltin oxide. One kind or two or more kinds thereof are used. Of those, antimony trioxide, tetrabutyl titanate, germanium dioxide, and zinc acetate are preferred from the viewpoint of a balance between the degree of catalytic activity and a hue.

The blending amount of the catalyst is preferably from 1 ppm to 10,000 ppm, particularly preferably from 10 ppm to 5,000 ppm, further preferably from 20 ppm to 3,000 ppm with respect to all the copolymerization components. When such blending amount is excessively small, there is a tendency that the polymerization reaction hardly advances in a sufficient manner. Even when the blending amount is excessively large, an advantage such as reaction time shortening is not obtained, and a side reaction tends to be liable to occur.

A reaction temperature at the time of the esterification reaction is preferably from 200° C. to 300° C., particularly preferably from 210° C. to 280° C., further preferably from 220° C. to 260° C. When such reaction temperature is excessively low, there is a tendency that the reaction hardly advances in a sufficient manner. When the reaction temperature is excessively high, a side reaction, such as decomposition, tends to be liable to occur. In addition, a pressure at the time of the reaction is typically normal pressure.

After the esterification reaction has been performed, the polycondensation reaction is performed.

Reaction conditions for the polycondensation reaction are preferably as follows: the same catalyst as that used in the esterification reaction is further blended in an amount comparable to that at the time of the esterification reaction into the resultant; a reaction temperature is set to preferably from 220° C. to 280° C., particularly preferably from 230° C. to 270° C.; and the reaction is performed while a pressure in a reaction system is gradually reduced to finally become 5 hPa or less. When such reaction temperature is excessively low, there is a tendency that the reaction hardly advances in a sufficient manner. When the reaction temperature is excessively high, a side reaction, such as decomposition, tends to be liable to occur.

Thus, the first or second polyester resin to be used in the present disclosure is obtained.

[First Polyester Resin]

Such first polyester resin contains the structural unit derived from the hydrogenated polybutadiene structure-containing compound, and the content of the structural unit derived from the hydrogenated polybutadiene structure-containing compound in the polyester resin is from 0.01 wt. % to 35 wt. %, preferably from 0.1 wt. % to 30 wt. %, particularly preferably from 0.2 wt. % to 20 wt. %, further preferably from 0.3 wt. % to 10 wt. %, more preferably from 0.4 wt. % to 5 wt. %, further particularly preferably from 0.5 wt. % to 8 wt. %.

In addition, the structural unit derived from the hydrogenated polybutadiene structure-containing compound in the first polyester resin is preferably incorporated as at least one selected from the group consisting of the structural unit derived from the polyvalent carboxylic acid (a1) and the structural unit derived from the polyol (a2) in terms of adhesive property with a polyolefin base material, and is further preferably incorporated as the structural unit derived from the polyol (a2).

Further, when a structural unit derived from the hydrogenated polybutadiene polyol is incorporated as the structural unit derived from the polyol (a2), the structural unit derived from the hydrogenated polybutadiene polyol is preferably incorporated at from 0.001 mol % to 10 mol % into the structural unit derived from the polyol (a2) in terms of the compatibility of the resin, and is incorporated at further preferably from 0.01 mol % to 8 mol %, particularly preferably from 0.03 mol % to 5 mol %, further particularly preferably from 0.04 mol % to 3 mol %, more preferably from 0.05 mol % to 0.5 mol %.

In addition, the first polyester resin typically has the structural unit derived from the polyvalent carboxylic acid (a1) and the structural unit derived from the polyol (a2). When a structural unit derived from the asymmetric aromatic polyvalent carboxylic acid is incorporated as the structural unit derived from the polyvalent carboxylic acid (a1), the content of the structural unit derived from the asymmetric aromatic polyvalent carboxylic acid in the structural unit derived from the polyvalent carboxylic acid (a1) is preferably from 1 mol % to 90 mol %, particularly preferably from 2 mol % to 80 mol %, further preferably from 3 mol % to 60 mol %, more preferably from 4 mol % to 50 mol %, further particularly preferably from 5 mol % to 40 mol %.

When a structural unit derived from the aliphatic polyvalent carboxylic acid having an odd number of carbon atoms is incorporated as the structural unit derived from the polyvalent carboxylic acid (a1), the content of the structural unit derived from the aliphatic polyvalent carboxylic acid having an odd number of carbon atoms in the structural unit derived from the polyvalent carboxylic acid (a1) is preferably from 5 mol % to 100 mol %, particularly preferably from 10 mol % to 100 mol %, further preferably from 20 mol % to 100 mol %, further particularly preferably from 30 mol % to 100 mol %.

Meanwhile, when a structural unit derived from the branched structure-containing polyol is incorporated as the structural unit derived from the polyol (a2), the structural unit derived from the branched structure-containing polyol is preferably incorporated at from 5 mol % to 99 mol % into the structural unit derived from the polyol (a2) because the crystallinity of the resin is broken, and the structural unit is incorporated at particularly preferably from 10 mol % to 98 mol %, further preferably from 30 mol % to 97 mol %.

In addition, when a structural unit derived from the linear polyol is incorporated, as the structural unit derived from the polyol (a2), the structural unit derived from the linear polyol is preferably incorporated at from 3 mol % to 95 mol % into the structural unit derived from the polyol (a2) in terms of stable resin formation, and is incorporated at further preferably from 5 mol % to 90 mol %, particularly preferably from 10 mol % to 80 mol %, further particularly preferably from 15 mol % to 60 mol %.

[Second Polyester Resin]

The second polyester resin contains the structural unit derived from the hydrogenated polybutadiene structure-containing compound and the structural unit derived from the aromatic ring structure-containing compound, and the content of the structural unit derived from the aromatic ring structure-containing compound in the polyester resin is from 0.01 wt. % to 35 wt preferably from 0.1 wt. % to 30 wt. %, particularly preferably from 0.3 wt. % to 25 wt. %, further preferably from 0.4 wt. % to 15 wt. %, further particularly preferably from 0.5 wt. % to 10 wt. %. When the content of the structural unit derived from the aromatic ring structure-containing compound falls within the range, the polyester pressure-sensitive adhesive composition is excellent in adhesive property with a polyolefin base material, and is also excellent in transparency.

In addition, the structural unit derived from the aromatic ring structure-containing compound in the second polyester resin is preferably incorporated as at least one selected from the group consisting of the structural unit derived from the polyvalent carboxylic acid (a1) and the structural unit derived from the polyol (a2) in terms of adhesive property with a polyolefin base material, and is further preferably incorporated as the structural unit derived from the polyvalent carboxylic acid (a1).

Further, when a structural unit derived from the aromatic dicarboxylic acid is incorporated as the structural unit derived from the polyvalent carboxylic acid (a1), the structural unit derived from the aromatic dicarboxylic acid is preferably incorporated at from 0.1 mol % to 70 mol % into the structural unit derived from the polyvalent carboxylic acid (a1) in terms of the adhesiveness of the resin, and is incorporated at further preferably from 0.2 mol % to 60 mol %, particularly preferably from 0.5 mol % to 50 mol %, further particularly preferably from 1 mol % to 40 mol %, more preferably from 3 mol % to 30 mol %.

The content of the structural unit derived from the hydrogenated polybutadiene structure-containing compound to be incorporated into the second polyester resin is typically from 0.01 wt. % to 50 wt. %, preferably from 0.1 wt. % to 30 wt. %, particularly preferably from 0.2 wt. % to 20 wt. %, further preferably from 0.3 wt. % to 10 wt. %.

In addition, the structural unit derived from the hydrogenated polybutadiene structure-containing compound in the second polyester resin is preferably incorporated as at least one selected from the group consisting of the structural unit derived from the polyvalent carboxylic acid (a1) and the structural unit derived from the polyol (a2) in terms of adhesive property with a polyolefin base material, and is further preferably incorporated as the structural unit derived from the polyol (a2).

Further, when a structural unit derived from the hydrogenated polybutadiene polyol is incorporated as the structural unit derived from the polyol (a2) in the second polyester resin, the structural unit derived from the hydrogenated polybutadiene polyol is preferably incorporated at from 0.001 mol % to 15 mol % into the structural unit derived from the polyol (a2) in terms of the compatibility of the resin, and is incorporated at further preferably from 0.005 mol % to 10 mol %, particularly preferably from 0.01 mol % to 5 mol %, further particularly preferably from 0.05 mol % to 2 mol %, more preferably from 0.1 mol % to 1 mol %.

In addition, the second polyester resin typically has the structural unit derived from the polyvalent carboxylic acid (a1) and the structural unit derived from the polyol (a2). When a structural unit derived from the asymmetric aromatic dicarboxylic acid is incorporated as the structural unit derived from the polyvalent carboxylic acid (a1), the content of the structural unit derived from the asymmetric aromatic dicarboxylic acid in the structural unit derived from the polyvalent carboxylic acid (a1) is preferably from 0.1 mol % to 70 mol %, particularly preferably from 0.2 mol % to 60 mol %, further preferably from 0.5 mol % to 50 mol %, further particularly preferably from 1 mol % to 40 mol %, more preferably from 3 mol % to 30 mol %.

When a structural unit derived from the aliphatic polyvalent carboxylic acid having an odd number of carbon atoms is incorporated as the structural unit derived from the polyvalent carboxylic acid (a1), the content of the structural unit derived from the aliphatic polyvalent carboxylic acid having an odd number of carbon atoms in the structural unit derived from the polyvalent carboxylic acid (a1) is preferably from 5 mol % to 100 mol %, particularly preferably from 10 mol % to 95 mol %, further preferably from 20 mol % to 90 mol %, further particularly preferably from 30 mol % to 80 mol %.

Meanwhile, when a structural unit derived from the branched structure-containing polyol is incorporated as the structural unit derived from the polyol (a2), the structural unit derived from the branched structure-containing polyol is preferably incorporated at from 5 mol % to 99 mol % into the structural unit derived from the polyol (a2) because the crystallinity of the resin is broken, and the structural unit is incorporated at particularly preferable from 10 mol % to 98 mol %, further preferably from 30 mol % to 97 mol %.

In addition, when a structural unit derived from the linear polyol is incorporated as the structural unit derived from the polyol (a2), the structural unit derived from the linear polyol is preferably incorporated at from 3 mol % to 95 mol % into the structural unit derived from the polyol (a2) in terms of stable resin formation, and is incorporated at further preferably from mol % to 90 mol %, particularly preferably from 10 mol % to 80 mol %, further particularly preferably from 15 mol % to 60 mol %.

Herein, the ratio (composition ratio) of a structural unit derived from each component in the first or second polyester resin may be determined by, for example, NMR.

The glass transition temperature of the first or second polyester resin is preferably from −80° C. to 20° C., particularly preferably from −75° C. to 10° C., further preferably from −70° C. to −20° C. in terms of its pressure-sensitive adhesive physical property. When such glass transition temperature is excessively high, the following tendency is observed: the flexibility of the composition is lost, and hence the initial pressure-sensitive adhesive property thereof reduces; accordingly, the pressure-sensitive adhesive force thereof is hardly exhibited by a pressure comparable to a finger pressure, and hence the workability thereof reduces. When the glass transition temperature is excessively low, the following tendency is observed: the cohesive force of the composition reduces, and hence a pressure-sensitive adhesive sheet formed of the composition is liable to deform to impair its appearance.

Herein, the glass transition temperature (Tg) of the polyester resin is a value measured with a differential scanning calorimeter DSC Q20 manufactured by TA Instruments Inc.

A measurement temperature range is from −90° C. to 100° C., and a rate of temperature increase is 10° C./min.

The first or second polyester resin is preferably free from crystallizing in terms of its storage stability. Even when the polyester resin crystallizes, its crystallization energy is preferably as low as possible, and is typically 35 J/g or less, preferably 20 J/g or less, particularly preferably 10 J/g or less, further particularly preferably 5 J/g or less.

The acid value of the first or second polyester resin is preferably 10 mgKOH/g or less, particularly preferably 3 mgKOH/g or less, further preferably 1 mgKOH/g or less. When the acid value is excessively high, in the case where a layer formed of a metal or the like is laminated on one surface of a pressure-sensitive adhesive layer containing the composition, the laminated layer tends to be liable to corrode. For example, when a configuration in which a metal oxide thin film layer is laminated is adopted, its corrosion tends to occur to reduce the conductivity of the metal oxide thin film layer.

Herein, the acid value of the polyester resin is determined by neutralization titration on the basis of JIS K 0070.

In addition, the weight-average molecular weight of the first or second polyester resin is preferably from 8,000 to 200,000, particularly preferably from 10,000 to 180,000, further preferably from 20,000 to 150,000 in terms of the cohesive force of the pressure-sensitive adhesive formed of the composition. When such weight-average molecular weight is excessively small, there is a tendency that the pressure-sensitive adhesive cannot obtain a sufficient cohesive force, and hence its heat resistance and mechanical strength are liable to reduce. When the weight-average molecular weight is excessively large, there is a tendency that gelation is liable to occur at the time of the production of the polyester resin, and hence the resin is hardly obtained.

The weight-average molecular weight is a weight-average molecular weight in terms of standard polystyrene molecular weight, and is measured by using, in a high performance liquid chromatograph (manufactured by Tosoh Corporation, "HLC-8320GPC") 2 columns "TSKGEL SUPERMULTI-PORE HZ-M" (exclusion limit molecular weight: $2\times10^6$, theoretical plate number: 16,000 plates/column, material for a filler: a styrene-divinylbenzene copolymer, particle diameter of the filler: 4 μm) connected in series. A similar method may be used for measuring the number-average molecular weight of the resin.

<Hydrolysis Inhibitor>

The polyester pressure-sensitive adhesive composition (hereinafter sometimes abbreviated as "pressure-sensitive adhesive composition") of the present disclosure preferably includes a hydrolysis inhibitor together with the polyester resin. Such hydrolysis inhibitor is incorporated for securing long-term durability.

A conventionally known hydrolysis inhibitor may be used as the hydrolysis inhibitor, and is, for example, a compound that reacts with a carboxylic acid terminal group of the polyester resin to be bonded thereto. Specific examples thereof include compounds each containing a functional group, such as a carbodiimide group, an epoxy group, or an oxazoline group. Of those, a carbodiimide group-containing compound is preferred because the compound has a high effect of causing the catalytic activity of a proton derived from the carboxylic acid terminal group to disappear.

Typically, a known polycarbodiimide having one or more carbodiimide groups (—N=C=N—) in a molecule thereof only needs to be used as the carbodiimide group-containing compound. To further improve the durability of the pressure-sensitive adhesive composition under high temperature and high humidity, a compound containing two or more carbodiimide groups in a molecule thereof, that is, a polyvalent carbodiimide compound is preferred, and a compound containing three or more carbodiimide groups is particularly preferred, a compound containing five or more carbodiimide groups is further preferred, and a compound containing seven or more carbodiimide groups is further particularly preferred. The number of carbodiimide groups present in a molecule of such compound is typically 50 or less, and a case in which the number of carbodiimide groups is excessively large tends to be unpreferred because the molecular structure thereof becomes excessively large. A high-molecular weight polycarbodiimide produced by subjecting a diisocyanate to a decarbonation condensation reaction in the presence of a carbodiimidation catalyst is also preferably used.

Further, a terminal isocyanate group of the high-molecular weight polycarbodiimide is preferably sealed with a sealing agent in terms of its storage stability. The sealing agent is, for example, a compound having active hydrogen that reacts with an isocyanate group, or a compound having an isocyanate group. Examples thereof include a monoalcohol analog, a monocarboxylic acid, a monoamine analog, and a monoisocyanate analog each having one substituent selected from a carboxyl group, an amino group, and an isocyanate group.

Such high-molecular weight polycarbodiimide is, for example, a polycarbodiimide obtained by subjecting any one of the following diisocyanates to a decarbonation condensation reaction.

Examples of such diisocyanates include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenyl ether diisocyanate, 3,3'-dimethyl-4,4'-diphenyl ether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethylxylylene diisocyanate. Those diisocyanates may be used alone or in combination thereof. Such high-molecular weight polycarbodiimide may be synthesized, or a commercial product thereof may be used.

Examples of the commercial product of the carbodiimide group-containing compound include CARBODILITE (trademark) series manufactured by Nisshinbo Chemical Inc. Of those, CARBODILITE (trademark) V-01, V-02B, V-03, V-04K, V-04PF, V-05, V-07, V-09, or V-09 GB is preferred because of its excellent compatibility with an organic solvent.

The epoxy group-containing compound is preferably, for example, a glycidyl ester compound or a glycidyl ether compound.

Specific examples of the glycidyl ester compound include benzoic acid glycidyl ester, t-Bu-benzoic acid glycidyl ester, p-toluic acid glycidyl ester, cyclohexanecarboxylic acid glycidyl ester, pelargonic acid glycidyl ester, stearic acid glycidyl ester, lauric acid glycidyl ester, palmitic acid glycidyl ester, behenic acid glycidyl ester, versatic acid glycidyl ester, oleic acid glycidyl ester, linoleic acid glycidyl ester, linolenic acid glycidyl ester, behenolic acid glycidyl ester, stearolic acid glycidyl ester, terephthalic acid diglycidyl ester, isophthalic acid diglycidyl ester, phthalic acid diglycidyl ester, naphthalenedicarboxylic acid diglycidyl ester, methylterephthalic acid diglycidyl ester, hexahydrophthalic acid diglycidyl ester, tetrahydrophthalic acid diglycidyl ester, cyclohexanedicarboxylic acid diglycidyl ester, adipic acid diglycidyl ester, succinic acid diglycidyl ester, sebacic acid diglycidylycidyl ester, dodecanedioic acid diglycidyl ester, octadecanedicarboxylic acid diglycidyl ester, trimellitic acid triglycidyl ester, and pyromellitic acid tetraglycidyl ester. Those glycidyl ester compounds may be used alone or in combination thereof.

Specific examples of the glycidyl ether compound include phenyl glycidyl ether, o-phenyl glycidyl ether, 1,4-bis(β,γ-epoxypropoxy)butane, 1,6-bis(β,γ-epoxypropoxy)hexane, 1,4-bis(β,γ-epoxypropoxy)benzene, 1-(β,γ-epoxypropoxy)-2-ethoxyethane, 1-(β,γ-epoxypropoxy)-2-benzyloxyethane, 2,2-bis-[p-(β,γ-epoxypropoxy)phenyl]propane, and a bisglycidyl polyether obtained by a reaction between a bisphenol, such as a bisphenol, such as 2,2-bis-(4-hydroxyphenyl)propane or 2,2-bis-(4-hydroxyphenyl)methane, and epichlorohydrin. Those glycidyl ether compounds may be used alone or in combination thereof.

The oxazoline group-containing compound is preferably, for example, a bisoxazoline compound. Specific examples thereof may include 2,2-bis(2-oxazoline), 2,2-bis(4-methyl-2-oxazoline), 2,2-bis(4,4-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4-dimethyl-2-oxazoline), 2,2'-m-phenylenebis(4-methyl-2-oxazoline), 2,2'-m-phenylenebis(4,4-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline). Of those, 2,2'-bis(2-oxazoline) is most preferred from the viewpoint of reactivity with a polyester. In addition, those oxazoline group-containing compounds may be used alone or in combination thereof.

Such hydrolysis inhibitor preferably has low volatility. To that end, a hydrolysis inhibitor having a high number-average molecular weight is preferably used, and the number-average molecular weight is typically from 300 to 10,000, preferably from 1,000 to 5,000.

In addition, a hydrolysis inhibitor having a high weight-average molecular weight is preferably used as the hydrolysis inhibitor from the viewpoint of hydrolysis resistance. The weight-average molecular weight of the hydrolysis inhibitor is preferably 500 or more, more preferably 2,000 or more, further preferably 3,000 or more. The upper limit of the weight-average molecular weight is typically 50,000.

When the molecular weight of the hydrolysis inhibitor is excessively small, its hydrolysis resistance tends to reduce. When the molecular weight is excessively large, the compatibility of the hydrolysis inhibitor with the polyester resin tends to reduce.

Of the hydrolysis inhibitors, the carbodiimide group-containing compound is preferably used, and its carbodiimide equivalent at that time is preferably from 50 to 10,000, particularly preferably from 100 to 1,000, further preferably from 150 to 500. The term "carbodiimide equivalent" refers to a chemical formula weight per one carbodiimide group.

The content of the hydrolysis inhibitor is preferably from 0.01 parts by weight to 10 parts by weight, particularly preferably from 0.1 parts by weight to 5 parts by weight, further preferably from 0.2 parts by weight to 3 parts by weight with respect to 100 parts by weight of the polyester resin. When such content is excessively large, the pressure sensitive adhesive composition tends to be turbid owing to insufficient compatibility of the hydrolysis inhibitor with the polyester resin, and when the content is excessively small, sufficient durability tends to be hardly obtained.

In addition, the content of the hydrolysis inhibitor is preferably optimized in accordance with the acid value of the polyester resin, and the molar ratio ((b)/(a)) of the total number of moles (b) of the functional group of the hydrolysis inhibitor in the pressure-sensitive adhesive composition to the total number of moles (a) of the acidic functional group of the polyester resin in the pressure-sensitive adhesive composition satisfies a relationship of preferably $0.5 \leq (b)/(a)$, particularly preferably $1 \leq (b)/(a) \leq 1,000$, further preferably $1.5 \leq (b)/(a) \leq 100$.

When the molar ratio of the number (b) to the number (a) is excessively low, the moist heat-resisting performance of the pressure-sensitive adhesive composition tends to reduce. When the molar ratio of the number (b) to the number (a) is excessively high, there is a tendency that the compatibility with the polyester resin reduces, or the pressure-sensitive adhesive force, cohesive force, or durability performance of the pressure sensitive adhesive composition reduces.

<Urethanization Catalyst>

The pressure-sensitive adhesive composition of the present disclosure, which includes the polyester resin and preferably includes the hydrolysis inhibitor, more preferably includes a urethanization catalyst in terms of its reaction rate.

Examples of the urethanization catalyst include an organometallic compound and a tertiary amine compound. Those urethanization catalysts may be used alone or in combination thereof.

Examples of the organometallic compound may include a zirconium compound, an iron compound, a tin compound, a titanium compound, a lead compound, a cobalt compound, and a zinc compound.

Examples of the zirconium compound include zirconium naphthenate and zirconium acetylacetonate.

Examples of the iron compound include iron acetylacetonate and iron 2-ethylhexanoate.

Examples of the tin compound include dibutyltin dichloride, dibutyltin oxide, and dibutyltin dilaurate.

Examples of the titanium compound include dibutyltitanium dichloride, tetrabutyl titanate, and butoxytitanium trichloride.

Examples of the lead compound include lead oleate, lead 2-ethylhexanoate, lead benzoate, and lead naphthenate.

Examples of the cobalt compound include cobalt 2-ethylhexanoate and cobalt benzoate.

Examples of the zinc compound include zinc naphthenate and zinc 2-ethylhexanoate.

In addition, examples of the tertiary amine compound include triethylamine, triethylenediamine, and 1,8-diazabicyclo-(5,4,0)-undecene-7.

Of those urethanization catalysts, the organometallic compound is preferred in terms of the reaction rate and the pot life of the pressure-sensitive adhesive layer, and the zirconium compound is particularly preferred. Further, acetylacetone is preferably used as a catalytic action inhibitor in combination with the urethanization catalyst. A catalyst system containing acetylacetone is preferred because the system inhibits the catalytic action of the catalyst at low temperature to lengthen the pot life.

<Crosslinking Agent>

The pressure-sensitive adhesive composition of the present disclosure, which includes the polyester resin and preferably includes the hydrolysis inhibitor, preferably further includes a crosslinking agent in normal cases. When the crosslinking agent is incorporated, the polyester resin is crosslinked with the crosslinking agent. Accordingly, the pressure-sensitive adhesive composition is excellent in cohesive force, and hence its performance as a pressure-sensitive adhesive can be improved.

Examples of such crosslinking agent include compounds each having a functional group that reacts with at least one selected from the group consisting of a hydroxy group and a carboxyl group in the polyester resin, such as a polyisocyanate compound and a polyepoxy compound. Of those, the polyisocyanate compound is particularly preferably used because the compound can achieve all of the initial pressure-sensitive adhesive property, mechanical strength, and heat resistance of the pressure-sensitive adhesive composition in a balanced manner.

Examples of such polyisocyanate compound include polyisocyanates, such tetramethylene diisocyanate, hexamethylene diisocyanate, isophorone diisocyanate, tolylene diisocyanate, diphenylmethane diisocyanate, hydrogenated diphenylmethane diisocyanate, xylylene diisocyanate, hydrogenated xylylene diisocyanate, tetramethylxylylene diisocyanate, 1,5-naphthalene diisocyanate, and triphenylmethane triisocyanate. Examples thereof also include an adduct form of the polyisocyanate and a polyol compound, such as trimethylolpropane, and a biuret form and an isocyanurate form of each of those polyisocyanate compounds. The polyisocyanate compound in which an isocyanate moiety is blocked with phenol, lactam, or the like may also be used. Those crosslinking agents may be used alone or in combination thereof.

Although the content of such crosslinking agent may be appropriately selected in accordance with the molecular weight of the polyester resin, and the applications and purposes of the pressure-sensitive adhesive composition, the crosslinking agent is typically incorporated at such a ratio that the equivalent number of a reactive group in the crosslinking agent becomes preferably from 0.2 equivalents to 10 equivalents, particularly preferably from 0.5 equivalents to 5 equivalents, further preferably from 0.5 equivalents to 3 equivalents with respect to 1 equivalent of at least one selected from the group consisting of a hydroxy group and a carboxyl group in the polyester resin.

When the equivalent number of the reactive group in such crosslinking agent is excessively small, the cohesive force of the pressure-sensitive adhesive composition tends to reduce, and when the equivalent number is excessively large, the flexibility thereof tends to reduce.

In addition, in the reaction between the polyester resin and the crosslinking agent, organic solvents free of any functional group that reacts with the polyester resin and a component of the crosslinking agent, for example, organic solvents including esters, such as ethyl acetate and butyl acetate, ketones, such as methyl ethyl ketone and methyl isobutyl ketone, and aromatics, such as toluene and xylene, may each be used. Those organic solvents may be used alone or in combination thereof.

In the pressure-sensitive adhesive composition of the present disclosure, in addition to the polyester resin, hydrolysis inhibitor, urethanization catalyst, and crosslinking agent described above, additives including an antioxidant, such as a hindered phenol, a softening agent, a UV absorbing agent, a stabilizer, an antistatic agent, and a tackifier, and other additives in a powder or particulate form, such as an inorganic or organic filler, metal powder, or a pigment, may each be blended to the extent that the effects of the present disclosure are not inhibited. Those additives may be used alone or in combination thereof.

In addition, a polyester pressure-sensitive adhesive (hereinafter sometimes abbreviated as "pressure-sensitive adhesive") according to the present disclosure is a pressure-sensitive adhesive formed of the above-mentioned pressure-sensitive adhesive composition, that is, pressure-sensitive adhesive obtained by curing the pressure-sensitive adhesive composition.

In addition, a pressure-sensitive adhesive sheet of the present disclosure is a pressure-sensitive adhesive sheet including a pressure-sensitive adhesive layer on one surface, or each of both surfaces, of a supporting base material, or a base material-less pressure-sensitive adhesive sheet, and is particularly suitable as a pressure-sensitive adhesive sheet for an optical member to be used in the bonding of an optical member.

In the present disclosure, the term "sheet" is described so as to mean a "film" and a "tape" as well, <Pressure-Sensitive Adhesive Sheet>

The pressure-sensitive adhesive sheet may be produced, for example, as described below.

Such pressure-sensitive adhesive sheet may be produced in accordance with a known and general method of producing a pressure-sensitive adhesive sheet, and the pressure-sensitive adhesive sheet of the present disclosure including, on a base material, a pressure-sensitive adhesive layer formed of the pressure-sensitive adhesive composition is obtained by, for example, applying the pressure-sensitive adhesive composition onto the base material, followed by drying, bonding a release sheet (or a release film) to the surface of the resultant pressure-sensitive adhesive composition layer, and aging the resultant as required.

The pressure-sensitive adhesive sheet of the present disclosure is also obtained by applying the pressure-sensitive adhesive composition onto the release sheet, followed by drying, bonding the base material to the surface of the resultant pressure-sensitive adhesive composition layer, and aging the resultant as required.

Further, a base material-less double-sided pressure-sensitive adhesive sheet may be produced by forming the pressure-sensitive adhesive layer on the release sheet and bonding another release sheet to the surface of the pressure-sensitive adhesive layer.

When the resultant pressure-sensitive adhesive sheet or base material-less double-sided pressure-sensitive adhesive sheet is used, the release sheet is peeled from the pressure-sensitive adhesive layer, and the pressure-sensitive adhesive layer and an adherend are bonded to each other.

Examples of the base material include: a sheet formed of at least one kind of synthetic resin selected from the group consisting of: polyester resins, such as a polyethylene naphthalate, a polyethylene terephthalate, a polybutylene terephthalate, and a polyethylene terephthalate/isophthalate copolymer; polyolefin resins, such as polyethylene, a polypropylene, and a polymethylpentene; polyethylene fluoride resins, such as a polyvinyl fluoride, a polyvinylidene fluoride, and a polyethylene fluoride; polyamides, such as nylon 6 and nylon 6,6; vinyl polymers, such as a polyvinyl chloride, a polyvinyl chloride/vinyl acetate copolymer, an ethylene-vinyl acetate copolymer, an ethylene-vinyl alcohol copolymer, a polyvinyl alcohol, and vinylon; cellulose resins, such as cellulose triacetate and cellophane; acrylic resins, such as a polymethyl methacrylate, a polyethyl methacrylate, a polyethyl acrylate, and a polybutyl acrylate; a polystyrene; a polycarbonate; a polyarylate; a polyimide; and cycloolefin polymers; metal foils, such as aluminum, copper, and iron; papers, such as wood-free paper and glassine paper; and woven fabrics and nonwoven fabrics formed of glass fibers, natural fibers, and synthetic fibers. Those base materials may be used as a single-layer body or a multi-layer body of two or more kinds thereof.

In particular, a base material formed of a polyethylene terephthalate or a polyimide out of those materials is preferred, a polyethylene terephthalate is particularly preferred because of its excellent adhesive property with the pressure-sensitive adhesive, and a polyethylene terephthalate having a metal thin film layer is further preferred because of the following reasons: a pressure-sensitive adhesive force between the base material and the pressure-sensitive adhesive is excellent; and the base material can be stably maintained without the corrosion of the metal thin film layer, and hence. The effect of the pressure-sensitive adhesive can be significantly exhibited.

In the present disclosure, an optical laminate (layer configuration: ITO electrode film/polyethylene terephthalate (PET) base material/pressure-sensitive adhesive layer/polycarbonate (PC) film/acrylic film) obtained as follows is also preferred: the pressure-sensitive adhesive layer is arranged on the PET side of a film obtained by forming an ITO electrode film as a thin film on a PET base material; the PET base material and a PC film are laminated via the pressure-sensitive adhesive layer; and an acrylic film is further laminated on the film.

In addition, a foam base material, for example, a foam sheet formed of a synthetic resin foam, such as a polyurethane foam, a polyethylene foam, or a polyacrylate foam, may be used as the base material. When the foam sheet is used, the pressure-sensitive adhesive sheet is excellent in flexibility, and hence its follow ability to an adherend and its pressure-sensitive adhesive strength are improved. Of those, the polyacrylate foam is preferred because of its excellent balance between the follow ability to an adherend and the pressure-sensitive adhesive strength.

[Filler]

In addition, the foam sheet may contain filler. The incorporation of the filler into the foam sheet can improve its shear strength. Thus, a resisting force (peel strength) against the peeling of the pressure-sensitive adhesive sheet from an adherend can be improved. In addition, the use of the filler suppresses excessive deformation of the foam sheet, and hence can suitably adjust a balance between the flexibility and cohesiveness of the entirety of the pressure-sensitive adhesive sheet.

Various particulate substances may each be used as the filler. Examples of materials forming such particulate substances include: metals, such as copper, nickel, aluminum, chromium, iron, and stainless steel; metal oxides, such as alumina and zirconia; carbides, such as silicon carbide, boron carbide, and nitrogen carbide; nitrides, such as aluminum nitride, silicon nitride, and boron nitride; inorganic materials, such as calcium carbide, calcium carbonate, aluminum hydroxide, glass, and silica; and polymers, such as a polystyrene, an acrylic resin (e.g., a polymethyl methacrylate), a phenol resin, a benzoguanamine resin, a urea resin, a silicone resin, nylon, a polyester, a polyurethane, a polyethylene, a polypropylene, a polyamide, a polyimide, a silicone, and vinylidene chloride. Natural raw material particles, such as volcanic ash and sand, may also be used. Those particulate substances may be used alone or in combination thereof.

In addition, the outer shape and particle shape of the particulate substance are not particularly limited.

Examples of the outer shape of the particulate substance include a spherical shape, a flake shape, and an indefinite shape. In addition, examples of the particle structure of the particulate substance include a dense structure, a porous structure, and a hollow structure.

The foam sheet preferably contains a particulate substance of a hollow structure (hereinafter sometimes referred to as "hollow particles") out of those substances as the filler, and more preferably contains hollow particles each formed of an inorganic material. Examples of such hollow particles include: a balloon made of glass, such as a hollow glass balloon; a hollow balloon made of a metal compound, such as a hollow alumina balloon; and a hollow balloon made of porcelain, such as a hollow ceramic balloon.

Commercial products such as products available under the product names "GLASS MICROBALLOON", "FUJI BALLOON H-40", and "FUJI BALLOON H-35" from Fuji Silysia Chemical Ltd., products available under the product names "CEL-STAR Z-20", "CEL-STAR Z-27", "CEL-STAR CZ-31T", "CEL-STAR Z-36", "CEL-STAR Z-39", "CEL-STAR Z-39", "CEL-STAR T-36", and "CEL-STAR PZ-6000" from Tokai Kogyo Co., Ltd., a product available under the product name "SILAX FINE BALLOON" from Fine-balloon Ltd., products available under the product names "Q-CEL (trademark) 5020", "Q-CEL (trademark) 7014", "SPHERICEL (trademark) 110P8", "SPHERICEL (trademark) 25P45", "SPHERICEL (trademark) 34P30", and "SPHERICEL (trademark) 60P18" from Potters Ballotini Co., Ltd., and products available under the product names "SUPER BALLOON BA-15" and "SUPER BALLOON 732C" from Showa Chemical Industry Co., Ltd. may each be used as the hollow glass balloon.

The average particle diameter of the hollow particles is not particularly limited. The average particle diameter of the hollow particles is, for example, typically from 1 μm to 500 μm, preferably from 5 μm to 400 μm, more preferably from 10 μm to 300 μm, further preferably from 10 μm to 200 μm, particularly preferably from 10 μm to 150 μm.

In addition, in normal cases, the average particle diameter of the hollow particles is suitably 50% or less of the thickness of the foam sheet, and is preferably 30% or less thereof, further preferably 10% or less thereof.

The specific gravity of the hollow particles, which is not particularly limited, is, for example, typically from 0.1 g/cm$^3$ to 1.8 g/cm$^3$, preferably from 0.1 cm$^3$ to 1.5 g 2/cm$^3$, further preferably from 0.1 g/cm$^3$ to 0.5 g/cm$^3$, particularly preferably from 0.3 g/cm$^3$ to 0.5 g/cm$^3$ in consideration of their uniform dispersibility, mechanical strength, and the like.

The usage amount of the hollow particles is not particularly limited, and may set to, for example, from 1 vol. % to 70 vol. % of the volume of the entirety of the foam sheet, and is set to preferably from 5 vol. % to 50 vol. % thereof, particularly preferably from 10 vol. % to 40 vol. % thereof.

[Cells]

The foam sheet may have cells by virtue of the filler, or may directly have cells. The incorporation of the cells into the foam sheet can improve the cushioning property of the pressure-sensitive adhesive sheet to improve its flexibility. As the flexibility of the pressure-sensitive adhesive sheet becomes higher, irregularities and steps on the surface of an adherend are easily absorbed by the deformation of the pressure-sensitive adhesive sheet, and hence the pressure-sensitive adhesive surface of the pressure-sensitive adhesive sheet can be brought into close contact with the surface of the adherend better. A state in which the pressure-sensitive adhesive surface is in close contact with the surface of an adherend well can advantageously contribute to improvements in peel strengths of the pressure-sensitive adhesive sheet to a low-polarity surface and other various surfaces.

In addition, an improvement in flexibility of the pressure-sensitive adhesive sheet can contribute to a reduction in repulsive force of the pressure-sensitive adhesive sheet. Thus, in, for example, the case where the pressure-sensitive adhesive sheet is bonded along the surface of an adherend having a curved surface or steps, or the case where an adherend having bonded thereto the pressure-sensitive adhesive sheet is deformed, an event in which the pressure-sensitive adhesive sheet is peeled (floated) from the surface of the adherend by its own repulsive force can be effectively suppressed.

The foam sheet may contain both of such filler as described above (e.g., hollow particles) and the cells. A pressure-sensitive adhesive sheet including such foam sheet is preferred because the pressure-sensitive adhesive sheet tends to be excellent in balance between its flexibility and cohesive force.

The cells in the foam sheet may be closed cells, or may be open cells, or these cells may be mixed. A foam sheet of a configuration containing many closed cells is preferred from the viewpoint of its cushioning property.

In the case of the closed cells, a gas component in each of the cells (a gas component forming the cells, hereinafter sometimes referred to as "cell-forming gas") is not particularly limited, and examples thereof include various gas components including: inert gases, such as nitrogen, carbon dioxide, and argon; and air. In addition, when, for example, the polymerization reaction of a synthetic resin for forming the foam sheet is performed under a state in which the cell-forming gas is incorporated, a gas that does not inhibit the reaction is preferably used as the cell-forming gas. Nitrogen may be suitably adopted as the cell-forming gas from such viewpoint and, for example, the viewpoint of cost.

The shapes of the cells are typically substantially spherical shapes, but are not limited thereto. The average diameter of the cells (average cell diameter) is not particularly limited, and is, for example, typically from 1 μm to 1,000 μm, preferably from 10 μm to 500 μm, further preferably from 30 μm to 300 μm.

In addition, in normal cases, the average cell diameter is suitably 50% or less of the thickness of the foam sheet, and is preferably 30% or less thereof, further preferably 10% or less thereof.

The average cell diameter may be typically determined with a scanning electron microscope (SEM), and is preferably determined by arithmetically averaging results obtained by measuring the diameters of 10 or more cells. At this time, cells of nonspherical shapes are converted into spherical cells having the same volumes before their average cell diameter is determined.

When the foam sheet has the cells, the volume ratio of the cells (cell content) in the foam sheet is not particularly limited, and may be appropriately set so that a target cushioning property and target flexibility may be achieved. The volume ratio may be set to, for example, from about 3 vol. % to about 70 vol. % with respect to the volume of the foam sheet (the volume refers to an apparent volume, and may be calculated from the thickness and area of the foam sheet). In normal cases, the volume ratio is suitably set to from about 5 vol. % to about 50 vol. % with respect thereto, and is preferably set to from about 8 vol. % to about 40 vol. % with respect thereto.

A method of forming the foam sheet is not particularly limited, and a known method may be appropriately adopted. For example, the following methods may each be appropriately adopted: (1) a method involving curing a synthetic resin composition in which a cell-forming gas has been mixed in advance (preferably a composition of such a type as to be cured by an active energy ray, such as UV light, to form a viscoelastic body) to form a cell-containing viscoelastic body layer; and (2) a method involving using a synthetic resin composition containing a foaming agent, and forming cells from the foaming agent to form a cell-containing viscoelastic body layer. The foaming agent to be used is not particularly limited, and may be appropriately selected from known foaming agents. For example, a foaming agent, such as a thermally expandable microsphere, may be preferably used.

In the formation of the cell-containing viscoelastic body layer by the method (1), a method of preparing the synthetic resin composition in which the cell-forming gas has been mixed is not particularly limited, and a known cell-mixing method may be utilized. For example, an apparatus including the following components is given as an example of a cell-mixing apparatus: a stator in which many fine teeth are arranged on a disc having a through-hole in its central portion; and a rotor that is opposed to the stator and has, on a disc, the same fine teeth as those of the stator. The composition before the mixing of cells is introduced into a space between the teeth on the stator and the teeth on the rotor in such cell-mixing apparatus, and the gas component for forming cells (cell-forming gas) is introduced through the through-hole while the rotor is rotated at a high speed. Thus, the synthetic resin composition in which the cells are finely dispersed and mixed is obtained.

The cell-containing viscoelastic body layer may be formed by applying the synthetic resin composition in which the cell-forming gas has been mixed as described above onto a predetermined surface, and curing the composition. A method involving heating the composition, a method involving irradiating the composition with an active energy ray (e.g., UV-light), or the like may be adopted as a curing method. The foam sheet may be suitably formed by subjecting the synthetic resin composition in which the cell-forming gas has been mixed to heating, active energy ray irradiation, or the like to cure the composition under a state in which the cells are stably held.

A surfactant may be added to the synthetic resin composition from the viewpoints of the mixability of the cell-forming gas and the stability of the cells. Examples of such surfactant include an ionic surfactant, a hydrocarbon surfactant, a silicone surfactant, and a fluorine surfactant. Of those, the fluorine surfactant is preferred, and a fluorine surfactant having an oxyalkylene group (typically an oxyalkylene group having 2 or 3 carbon atoms) and a fluorinated hydrocarbon group in a molecule thereof is particularly preferred. The fluorine surfactants may be used alone or in combination thereof. A preferred commercial product of the fluorine surfactant is, for example, a product available under the product name "SURFLON S-393" from AGO Seimi Chemical Co., Ltd.

The usage amount of the surfactant is not particularly limited, and is, for example, typically from about 0.01 parts by weight to about 3 parts by weight with respect to 100 parts by weight of the synthetic resin in the foam sheet on a solid content basis.

The foam sheet may contain a known additive, such as a plasticizer, a softening agent, a colorant (e.g., a pigment or a dye), an antioxidant, a leveling agent, a stabilizer, or an antiseptic, as required to the extent that the effects of the present disclosure are not remarkably inhibited. For example, when the synthetic resin composition is cured by a photopolymerization method to form the foam sheet, a pigment (coloring pigment) may be used as a colorant for coloring the foam sheet to such an extent that the photopolymerization is not inhibited. When the foam sheet is desired to be colored black, for example, carbon black may be preferably used as the colorant. The usage amount of the carbon black is, for example, 0.15 wt. % or less, preferably from 0.001 wt. % to 0.15 wt. %, further preferably from 0.01 wt. % to 0.1 wt. % of the entirety of the foam sheet in consideration of the degree of the coloring, the photopolymerization reactivity of the composition, and the like.

The thickness of the base material is, for example, preferably from 1 μm to 1,000 μm, particularly preferably from 2 μm to 500 μm, further preferably from 3 μm to 300 μm.

For example, a product obtained by subjecting any one of the sheets formed of various synthetic resins, and the paper, the fabric, and the nonwoven fabric given as examples of the base material to a release treatment may be used as the release sheet. A silicone release sheet is preferably used as the release sheet.

For example, a gravure roll coater, a reverse roll coater, a kiss-roll coater, a dip roll coater, a bar coater, a knife coater, a spray coater, or a comma coater only needs to be used as an apparatus for applying the pressure-sensitive adhesive composition.

The aging treatment is performed under the conditions of a temperature of typically from room temperature (23° C.) to 70° C. and a time period of typically from 1 day to 30 days. Specifically, the treatment only needs to be performed under, for example, the following conditions at 23° C. for from 1 day to 20 days, preferably at 23° C. for from 3 days to 14 days, or at 40° C. for from 1 day to 10 days.

In addition, conditions for the drying are as follows: a drying temperature is preferably from 60° C. to 140° C., particularly preferably from 80° C. to 120° C., and a drying time is preferably from 0.5 minutes to 30 minutes, particularly preferably from 1 minute to 5 minutes.

The thickness of the pressure-sensitive adhesive layer of the pressure-sensitive adhesive sheet or the base material-less double-sided pressure-sensitive adhesive sheet is preferably from 2 μm to 500 μm, particularly preferably from 5 μm to 200 μm, further preferably from 10 μm to 100 μm. When the thickness of such pressure-sensitive adhesive layer is excessively small, its pressure-sensitive adhesive force tends to reduce. When the thickness is excessively large, it becomes difficult to uniformly apply the pressure-sensitive adhesive composition. In addition, an inconvenience such as the inclusion of cells in the applied film tends to be liable to occur. When the impact absorbability of the layer is considered, the thickness is preferably set to 50 μm or more.

The thickness of the pressure-sensitive adhesive layer is determined by subtracting the value of the thickness of a constituent member except the pressure-sensitive adhesive layer measured with "ID-C112B" manufactured by Mitutoyo Corporation from the value of the thickness of the entirety of the pressure-sensitive adhesive sheet measured therewith.

The gel fraction of the pressure-sensitive adhesive layer of the pressure-sensitive adhesive sheet is preferably 5 wt. % or more in terms of the durability performance and pressure-sensitive adhesive force of the sheet, and is particularly preferably from 10 wt. % to 90 wt. %, further preferably from 15 wt. % to 80 wt. %, further particularly preferably from 20 wt. % to 60 wt. %. When the gel fraction is excessively low, the durability of the sheet tends to reduce owing to a reduction in cohesive force thereof. When the gel fraction is excessively high, the pressure-sensitive adhesive force thereof tends to reduce owing to an increase in cohesive force thereof.

The gel fraction serves as a guideline on the degree of crosslinking of the pressure-sensitive adhesive composition, and is calculated by, for example, the following method. That is, a pressure-sensitive adhesive sheet (in which no release sheet is arranged) obtained by forming the pressure-sensitive adhesive layer on a polymer sheet (e.g., a PET film) serving as the base material is wrapped with a 200-mesh wire gauze made of SUS, and is immersed in toluene at 23° C. for 24 hours. The weight percentage of an undissolved pressure-sensitive adhesive component remaining in the wire gauze with respect to the weight of the wrapped product before the immersion is adopted as the gel fraction; provided that the weight of the base material is subtracted from the weight of the wrapped product.

Further, such pressure-sensitive adhesive sheet may be protected by arranging a release sheet outside the pressure-sensitive adhesive layer as required. In addition, in a pressure-sensitive adhesive sheet in which the pressure-sensitive adhesive layer is formed on one surface of the base material, the pressure-sensitive adhesive layer can be protected as follows: the surface of the base material opposite to the pressure-sensitive adhesive layer is subjected to a release treatment, and the release-treated surface is utilized to protect the layer.

In addition, the pressure-sensitive adhesive of the present disclosure may be used in the bonding of various members. The pressure-sensitive adhesive is preferably used as a pressure-sensitive adhesive for an optical member to be used in the bonding of an optical member out of those members, and an optical member with a pressure-sensitive adhesive layer can be obtained by laminating and forming, on an optical member, a pressure-sensitive adhesive layer containing such pressure-sensitive adhesive.

Examples of such optical member include: transparent electrode films including inorganic and organic conductive films, such as an ITO electrode film and a polythiophene; a polarizing plate; a retardation plate; an elliptically polarizing plate; an optical compensation film; a brightness enhancement film; and electromagnetic wave-shielding film; a near-infrared ray-absorbing film; and an antireflection (AR) film. The optical member is preferably a transparent electrode film out of those members because, in this case, the pressure-sensitive adhesive layer effectively provides a high pressure-sensitive adhesive force; the optical member is particularly preferably an ITO electrode film. An ITO electrode film is often formed as a thin film on a base material made of glass, a PET, or the like. In the present disclosure, however, a film in which an ITO electrode film is formed as a thin film on a PET base material is particularly preferably used.

In addition, the optical member with a pressure-sensitive adhesive layer is suitable for a light extraction film arranged on the light-emitting surface of the surface emitter of an organic EL element, or for the light-diffusing sheet of a liquid crystal display.

In the optical member with a pressure-sensitive adhesive layer, a release sheet is preferably further arranged on the surface of the pressure-sensitive adhesive layer opposite to an optical member surface, and when the optical member with a pressure-sensitive adhesive layer is put into practical use, the release sheet is peeled, and the pressure-sensitive adhesive layer and an adherend are bonded to each other. A silicone release sheet is preferably used as such release sheet.

EXAMPLES

Now, the present disclosure is more specifically described by way of Examples. The present disclosure is not limited to Examples described below without departing from the gist of the present disclosure. The term "part(s)" in the examples is on a weight basis.

In addition, the glass transition temperatures of polyester resins in Examples described below were measured in accordance with the method described in the foregoing.

<Production of Polyester Resin>

The term "mol %" described in the following production examples represents a molar ratio when the total amount of the polyvalent carboxylic acid (a1) is set to 100 mol %.

[Production of Polyester Resin I]

66.3 Parts (20 mol %) of isophthalic acid (IPA) [asymmetric aromatic dicarboxylic acid] and 322.9 parts (80 mol %) of sebacic acid (SebA) serving as the polyvalent carboxylic acids (a1), 207.9 parts (100 mol %) of neopentyl glycol (NPG) [branched structure-containing polyol], 89.9 parts (50 mol %) of 1,4-butanediol (1.4BG) [linear polyol], 4.0 parts (1.5 mol %) of trimechylolpropane (TMP), and 9.0 parts (0.3 mol %) of a hydrogenated polybutadiene polyol (manufactured by Nippon Soda. Co., Ltd., "GI-1000") [hydrogenated polybutadiene structure-containing compound] serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, polyester resin was produced.

The resultant polyester resin I had a glass transition temperature of −46.8° C., and had the following ratios between structural units derived from finished components (hereinafter sometimes abbreviated as "finished component ratios") the ratios of isophthalic acid/sebacic acid serving as the polyvalent carboxylic acids (a1) were 20 mol %/80 mol %, and the ratios of neopentyl glycol/1,4-butanediol/trimethylolpropane/hydrogenated polybutadiene polyol serving as the polyols (a2) were 64.5 mol %/33.7 mol %/1.5 mol %/0.3 mol %.

The content of the structural unit derived from the hydrogenated polybutadiene structure-containing compound in the polyester resin I was 1.7 wt. %, and the content of a structural unit derived from an aromatic ring structure-containing compound therein was 10 wt. %.

[Production of Polyester Resin II]

64.6 Parts (20 mol %) of isophthalic acid and 314.4 parts (80 mol %) of sebacic acid serving as the polyvalent carboxylic acids (a1), 200.4 parts (99 mol %) of neopentyl glycol, 87.6 parts (50 mol %) of 1,4-butanediol, 3.9 parts (1.5 mol %) of trimethylolpropane, and 29.1 parts (1 mol %) of a hydrogenated polybutadiene polyol (manufactured by Nippon Soda Co., Ltd., "GI-1000") serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, a polyester resin II was produced.

The resultant polyester resin II had a glass transition temperature of −47.7° C., and had the following finished component ratios: the ratios of isophthalic acid/sebacic acid serving as the polyvalent carboxylic acids (a1) were 20 mol %/80 mol %, and the ratios of neopentyl glycol/1,4-butanediol/trimethylolpropane/hydrogenated polybutadiene polyol serving as the polyols (a2) were 63.8 mol %/33.7 mol %/1.5 mol %/1 mol %.

The content of the structural unit derived from the hydrogenated polybutadiene structure-containing compound in the polyester resin II was 5.5 wt. %, and the content of a structural unit derived from an aromatic ring structure-containing compound therein was 9.7 wt. %.

[Production of Polyester Resin III]

43.7 Parts (20 mol %) of isophthalic acid and 212.7 parts (80 mol %) of sebacic acid serving as the polyvalent carboxylic acids (a1), 123.2 parts (90 mol %) of neopentyl glycol, 59.2 parts (50 mol %) of 1,4-butanediol, 3.5 parts (1.5 mol %) of trimethylolpropane, and 157.7 parts (8 mol %) of a hydrogenated polybutadiene polyol (manufactured by Nippon Soda Co., Ltd., "GI-1000") serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, a polyester resin III was produced.

The resultant polyester resin III had a glass transition temperature of −47.5° C., and had the following finished component ratios: the ratios of isophthalic acid/sebacic acid serving as the polyvalent carboxylic acids (a1) were 20 mol %/80 mol %, and the ratios of neopentyl glycol/1,4-butanediol/trimethylolpropane/hydrogenated polybutadiene polyol serving as the polyols (a2) were 56.9 mol %/33.1 mol %/2 mol %/8 mol %.

The content of the structural unit derived from the hydrogenated polybutadiene structure-containing compound in the polyester resin III was 32.3 wt. %, and the content of a structural unit derived from an aromatic ring structure-containing compound therein was 7.1 wt. %.

[Production of Polyester Resin IV]

67.4 Parts (20 mol. %) of isophthalic acid, 152.7 parts (40 mol %) of azelaic acid (AzA), and 164.1 parts (40 mol %) of sebacic acid serving as the polyvalent carboxylic acids (a1), 211.2 parts (100 mol %) of neopentyl glycol, 91.4 parts (50 mol %) of 1,4-butanediol, 4.1 parts (1.5 mol %) of trimethylolpropane, and 9.1 parts (0.3 mol %) of a hydrogenated polybutadiene polyol (manufactured by Nippon Soda Co., Ltd., "GI-1000") serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, a polyester resin TV was produced.

The resultant polyester resin TV had a glass transition temperature of −45.7° C., and had the following finished component ratios: the ratios of isophthalic acid/azelaic acid/sebacic acid serving as the polyvalent carboxylic acids (a1) were 20 mol %/40 mol %/40 mol %, and the ratios of neopentyl glycol/1,4-butanediol/trimethylolpropane/hydrogenated polybutadiene polyol" serving as the polyols (a2) were 64.5 mol %/33.7 mol %/1.5 mol %/0.3 mol %.

The content of the structural unit derived from the hydrogenated polybutadiene structure-containing compound in the polyester resin IV was 1.7 wt. %, and the content of a structural unit derived from an aromatic ring structure-containing compound therein was 10.3 wt. %.

[Production of Polyester Resin V]

308.6 Parts (100 mol %) of azelaic acid serving as the polyvalent carboxylic acid (a1), 163.9 parts (96 mol %) of neopentyl glycol, 73.9 parts (50 mol %) of 1,4-butanediol, 4.4 parts (2 mol %) of trimethylolpropane, and 49.2 parts (2 mol %) of a hydrogenated polybutadiene polyol (manufactured by Nippon Soda Co., Ltd., "GT-1000") serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, polyester resin V was produced.

The resultant polyester resin V had a glass transition temperature of −59.4° C., and had the following finished component ratios: the ratio of azelaic acid serving as the polyvalent carboxylic acid (a1) was 100 mol %, and the ratios of neopentyl glycol/1,4-butanediol/trimethylolpropane/hydrogenated polybutadiene polyol serving as the polyols (a2) were 62.2 mol %/33.8 mol %/2 mol %/2 mol %.

The content of the structural unit derived from the hydrogenated polybutadiene structure-containing compound in the polyester resin V was 10.7 wt. %, and the content of a structural unit derived from an aromatic ring structure-containing compound therein was 0 wt. %.

[Production of Polyester Resin VI]

45.7 Parts (10 mol %) of isophthalic acid and 500.3 parts mol %) of sebacic acid serving as the polyvalent carboxylic acids (a1), 283.4 parts (99 mold) of neopentyl glycol, 123.9 parts (50 mol %) of 1,4-butanediol, 5.5 parts (1.5 mol %) of trimethylolpropane, and 41.5 parts (1.0 mol %) of a hydrogenated polybutadiene polyol (manufactured by Nippon Soda Co., Ltd., "GI-1000") serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, a polyester resin VI was produced.

The resultant polyester resin VI had a glass transition temperature of −53.8° C., and had the following finished component ratios: the ratios of isophthalic acid sebacic acid serving as the polyvalent carboxylic acids (a1) were 10 mol %/90 mol %, and the ratios of neopentyl glycol/1,4-butanediol/trimethylolpropane/hydrogenated polybutadiene polyol serving as the polyols (a2) were 63.8 mol %/33.7 mol %/1.5 mol %/1 mol %.

The content of the structural unit derived from the hydrogenated polybutadiene structure-containing compound in the polyester resin VI was 5.4 wt. %, and the content of a structural unit derived from an aromatic ring structure-containing compound therein was 4.8 wt. %.

[Production of Polyester Resin VII]

193.5 Parts (40 mol %) of isophthalic acid and 353.2 parts (60 mol %) of sebacic acid serving as the polyvalent carboxylic acids (a1), 303.2 parts (100 mol %) of neopentyl glycol, 131.2 parts (50 mol %) of 1,4-butanediol, 5.9 parts (1.5 mol %) of trimethylolpropane, and 13.1 parts (0.3 mol %) of a hydrogenated polybutadiene polyol (manufactured by Nippon Soda Co., Ltd., "GI-1000") serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, a polyester resin VII was produced.

The resultant polyester resin. VII had a glass transition temperature of −33.8° C., and had the following finished component ratios: the ratios of isophthalic acid/sebacic acid serving as the polyvalent carboxylic acids (a1) were 40 mol %/60 mol %, and the ratios of neopentyl glycol/1,4-butanediol/trimethylolpropane/hydrogenated polybutadiene polyol serving as the polyols (a2) were 64.5 mol %/33.7 mol %/1.5 mol %/0.3 mol %.

The content of the structural unit derived from the hydrogenated polybutadiene structure-containing compound in the polyester resin VII was 1.8 wt. %, and the content of a structural unit derived from an aromatic ring structure-containing compound therein was 20.7 wt. %.

[Production of Polyester Resin I']

67.3 Parts (20 mol %) of isophthalic acid and 327.5 parts (80 mol %) of sebacic acid serving as the polyvalent carboxylic acids (a1), 189.7 parts (90 mol %) neopentyl glycol, 91.2 parts (50 mol %) of 1,4-butanediol 3.5 parts (1 mol %) of trimethylolpropane, and 20.8 parts (9 mol %) of 1,6-hexanediol (1.6HG) [linear polyol] serving as the polyols (a2), and 0.05 parts of zinc acetate serving as a catalyst were loaded into a reaction can including a heating apparatus, a temperature gauge, a stirring machine, a rectifying column, a nitrogen-introducing tube, and a vacuum apparatus, and a temperature in the can was gradually increased to 250° C., followed by the performance of an esterification reaction over 4 hours.

After that, the temperature in the can was increased to 260° C., and 0.05 parts of tetrabutyl titanate was loaded as a catalyst into the can. A pressure in the can was reduced to 1.33 hPa, and a polymerization reaction was performed over 3 hours. Thus, polyester resin was produced.

The resultant polyester resin had a glass transition temperature of −48.5° C., and had the following finished component ratios: the ratios of isophthalic acid/sebacic acid serving as the polyvalent carboxylic acids (a1) were 20 mol %/80 mol %, and the ratios of neopentyl glycol/1,4-butanediol/trimethylolpropane/1,6-hexanediol serving as the polyols (a2) were 58.5 mol %/34.0 mol %/1.3 mol %/6.2 mol %.

The content of the structural unit derived from the hydrogenated polybutadiene structure-containing compound in the polyester resin I' was 0 wt. %, and the content of a structural unit derived from an aromatic structure-containing compound therein was 10.2 wt. %.

The results of the resin composition (structural units derived from the finished components) of each of the resultant polyester resins, and the glass transition temperatures (Tg) of the resins are collectively shown in Table 1 below.

<Production of Polyester Pressure-Sensitive Adhesive Composition>

Polyester pressure-sensitive adhesive compositions of Examples and Comparative Example described below were produced by using the respective polyester resins obtained in the foregoing.

Example 1

The polyester resin I obtained in the foregoing was diluted to a solid content concentration of 50% with toluene, and 200 parts (100 parts in terms of solid content) of the solution of the polyester resin I was blended with 1 part (solid content) of a hydrolysis inhibitor (manufactured by Nisshinbo Chemical Inc., "CARBODILITE V-09GB"), 3 parts (solid content) of a trimethylolpropane-tolylene diisocyanate adduct (manufactured by Tosoh Corporation, "CORONATE L-55E") serving as a crosslinking agent, and 0.01 parts (solid content) of a zirconium compound (manufactured by Matsumoto Fine Chemical Co., Ltd., "ORGATIX ZC-150") diluted to a solid content concentration of 1% with acetylacetone, the diluted compound serving as a urethanization catalyst, followed by stirring and mixing. Thus, a polyester pressure-sensitive adhesive composition was obtained.

Example 2

A polyester pressure-sensitive adhesive composition was obtained in the same manner as in Example 1 except that, in Example 1, the polyester resin I was changed to the polyester resin II.

Example 3

A polyester pressure-sensitive adhesive composition was obtained in the same manner as in Example 1 except that, in Example 1, the polyester resin was changed to the polyester resin III.

TABLE 1

| Polyester resin | Polyvalent carboxylic acid component (a1) (mol %) | | | Polyol component (a2) (mol %) | | | | | Structural unit derived from hydrogenated polybutadiene structure-containing compound (wt. %) | Structural unit derived from aromatic ring structure-containing compound (wt. %) | Glass transition temperature (° C.) |
|---|---|---|---|---|---|---|---|---|---|---|---|
|  | IPA | SebA | AzA | NPG | 1,4BG | TMP | 1,6HG | GI-1000 |  |  |  |
| I | 20 | 80 | — | 64.5 | 33.7 | 1.5 | — | 0.3 | 1.7 | 10 | −46.8 |
| II | 20 | 80 | — | 63.8 | 33.7 | 1.5 | — | 1 | 5.5 | 9.7 | −47.7 |
| III | 20 | 80 | — | 56.9 | 32.1 | 2 | — | 8 | 32.3 | 7.1 | −47.5 |
| IV | 20 | 40 | 40 | 64.5 | 33.7 | 1.5 | — | 0.3 | 1.7 | 10.3 | −45.7 |
| V | — | — | 100 | 62.2 | 33.8 | 2 | — | 2 | 10.7 | 0 | −59.4 |
| VI | 10 | 90 | — | 63.8 | 33.7 | 1.5 | — | 1 | 5.4 | 4.8 | −53.8 |
| VII | 40 | 60 | — | 64.5 | 33.7 | 1.5 | — | 0.3 | 1.8 | 20.7 | −33.8 |
| I' | 20 | 80 | — | 58.5 | 34 | 1.3 | 6.2 | — | 0 | 10.2 | −48.5 |

IPA: isophthalic acid,
SebA: sebacic acid,
AzA: azelaic acid
NPG: neopentyl glycol,
1,4BG: 1,4-butanediol,
TMP: trimethylolpropane,
1,6HG: 1,6-hexanediol
GI-1000: hydrogenated polybutadiene polyol

Example 4

A polyester pressure-sensitive adhesive composition was obtained in the same manner as in Example 1 except that, in Example 1, the polyester resin I was changed to the polyester resin IV.

Example 5

A polyester pressure-sensitive adhesive composition was obtained in the same manner as in Example 1 except that, in Example 1, the polyester resin I was changed to the polyester resin V.

Example 6

The polyester resin VI obtained in the foregoing was diluted to a solid content concentration of 50% with toluene, and 200 parts (100 parts in terms of solid content) of the solution of the polyester resin VI was blended with 1 part (solid content) of a hydrolysis inhibitor (manufactured by Nisshinbo Chemical Inc., "CARBODILITE V-09GB"), 2 parts (solid content) of a trimethylolpropane/tolylene diisocyanate adduct (manufactured by Tosoh Corporation, "CORONATE L-55E") serving as a crosslinking agent, and 0.02 parts (solid content) of a zirconium compound (manufactured by Matsumoto Fine Chemical Co., Ltd., "ORGATIX ZC-150") diluted to a solid content concentration of 1% with acetylacetone, the diluted compound serving as a urethanization catalyst, followed by stirring and mixing. Thus, a polyester pressure-sensitive adhesive composition was obtained.

Example 7

A polyester pressure-sensitive adhesive composition was obtained in the same manner as in Example 1 except that, in Example 1, the polyester resin I was changed to the polyester resin VII, and the amount of the crosslinking agent was changed to 3 parts.

Comparative Example 1

A polyester pressure-sensitive adhesive composition was obtained in the same manner as in Example 1 except that, in Example 1, the polyester resin I was changed to the polyester resin I', the amount of the crosslinking agent was changed from 3 parts to 2 parts, and toluene was changed to ethyl acetate.

A pressure-sensitive adhesive sheet with release films on both surfaces thereof and a pressure-sensitive adhesive sheet with a release film on one surface thereof were produced by using each of the polyester pressure-sensitive adhesive compositions obtained in the foregoing.

<Production of Pressure-Sensitive Adhesive Sheet with Release Films on Both Surfaces Thereof>

The polyester pressure-sensitive adhesive composition of each of Examples 1 to 7 and Comparative Example 1 was applied onto a PET-made release film (α) having a thickness of 38 μm (manufactured by Mitsui Chemicals Tohcello, Inc., "SP-PET-03-BU") with an applicator, and was dried at 100° C. for 4 minutes. Thus, a pressure-sensitive adhesive sheet with a release film whose pressure-sensitive adhesive composition layer had a thickness of 50 μm was obtained.

Next, the surface of the pressure-sensitive adhesive composition layer of the resultant pressure-sensitive adhesive sheet with a release film was covered with a PET-made release film (β) having a thickness of 38 μm (manufactured by Mitsui Chemicals Tohcello, Inc., "SP-PET-01-BU"), the release film having a peel force different from that of the release film (n), and the resultant was subjected to an aging treatment at 40° C. for 4 days. Thus, a pressure-sensitive adhesive sheet with release films on both surfaces thereof was obtained, <Production of Pressure-Sensitive Adhesive Sheet with Release Film on One Surface Thereof>

The polyester pressure-sensitive adhesive composition of each of Examples 1 to 7 and Comparative Example 1 was applied onto a PET film having a thickness of 38 μm (manufactured by Toray Industries, Inc., "LUMIRROR T60") with an applicator, and was dried at 100° C. for 3 minutes. Thus, a pressure-sensitive adhesive sheet with a PET film whose pressure-sensitive adhesive composition layer had a thickness of 25 μm was obtained.

Next, the surface of the pressure-sensitive adhesive composition layer of the resultant pressure-sensitive adhesive sheet with a PET film was covered with a PET-made release film (β) having a thickness of 38 μm, and the resultant was subjected to an aging treatment at 40° C. for 4 days. Thus, a pressure-sensitive adhesive sheet with a release film on one surface thereof was obtained.

A pressure-sensitive adhesive force, transparency (haze), and solution transparency were evaluated by using the pressure-sensitive adhesive sheet with release films on both surfaces thereof and the pressure-sensitive adhesive sheet with a release film on one surface thereof in each of Examples 1 to 7 and Comparative Example 1 thus obtained in accordance with the following evaluation methods.

<Pressure-Sensitive Adhesive Sheet Evaluation>

[Pressure-Sensitive Adhesive Force]

Each pressure-sensitive adhesive sheet with a release film on one surface thereof obtained in the foregoing was cut into a size measuring 25 mm by 200 mm under an environment at 23° C. and 50% RH. After that, the release film (is) was peeled, and the pressure-sensitive adhesive layer side of the remainder was bonded to each of a mirror-finished stainless-steel plate (SUS-BA plate) and a polypropylene (PP) plate under pressure by reciprocating a 2-kilogram roller, followed by standing under the environment for 24 hours. After that, the 180-degree peeling degree (N/25 mm) of the resultant was measured with an autograph (manufactured by Shimadzu Corporation, "AUTOGRAPH AGS-H 500N") at a peel rate of 300 mm/min.

[Haze (Transparency)]

The release film (p) on one surface was peeled from the pressure-sensitive adhesive layer of each pressure-sensitive adhesive sheet with release films on both surfaces thereof obtained in the foregoing, and the pressure-sensitive adhesive layer side of the remainder was bonded to an alkali-free glass plate (manufactured by Corning Incorporated, EAGLE XG). After that, the release film (α) on the other surface was peeled. Thus, an alkali-free glass plate with a pressure-sensitive adhesive layer was obtained. The haze of the alkali-free glass plate with a pressure-sensitive adhesive layer was measured with HAZE METER NDH2000 (manufactured by Nippon Denshoku industries Co., Ltd.), and was evaluated by the following criteria. A lower haze means that the alkali-free glass plate with a pressure-sensitive adhesive layer is superior in transparency. In addition, the machine is in conformity with JIS K 7361-1.

(Evaluation Criteria)

∘∘ . . . The haze is 1.0% or less.
　∘ . . . The haze is more than 1.0% and 5.0% or less.
　× . . . The haze is more than 5,0%.

[Solution Transparency (Compatibility)]

Only 200 parts (100 parts in terms of solid content) of the polyester resin solution and 1 part (solid content) of the hydrolysis inhibitor (manufactured by Nisshinbo Chemical Inc., "CARBODILITE V-09GB") used in each of Examples 1 to 7 and Comparative Example 1 described above were blended with each other to prepare a blended liquid, and a change in appearance before and after the blending was visually evaluated by the following criteria.

(Evaluation Criteria)
- ⊚ . . . No change in appearance occurs.
- ○ . . . The blended liquid transmits light, but is turbid.
- × . . . The blended liquid does not transmit light, and is turbid to a large extent.

The results of Examples 1 to 7 and. Comparative Example 1 are shown in Table 2 below.

TABLE 2

| | Polyester resin | Pressure-sensitive adhesive force (N/25 mm) | | Transparency | | Solution transparency |
| --- | --- | --- | --- | --- | --- | --- |
| | | SUS-BA plate | PP plate | Haze (%) | Evaluation | |
| Example 1 | I | 20.7 | 12.9 | 0.6 | ⊚ | ⊚ |
| Example 2 | II | 22.5 | 14.2 | 1.6 | ○ | ⊚ |
| Example 3 | III | 19.6 | 15.8 | 2.1 | ○ | ⊚ |
| Example 4 | IV | 20.7 | 11.5 | 0.7 | ⊚ | ⊚ |
| Example 5 | V | 16.1 | 7.4 | 0.4 | ⊚ | ⊚ |
| Example 6 | VI | 14.2 | 13 | 0.4 | ⊚ | ⊚ |
| Example 7 | VII | 16.9 | 11.5 | 1.8 | ○ | ⊚ |
| Comparative Example 1 | I' | 15.4 | 0.4 | 0.5 | ⊚ | ⊚ |

As can be seen from the results of Table 2 above, each of the polyester pressure-sensitive adhesive compositions of Examples 1 to 7 was excellent not only in adhesive property with the SUS-BA plate but also in adhesive property with a polyolefin base material like the PP plate, and was also excellent in haze (transparency) and solution transparency. In contrast, the polyester pressure-sensitive adhesive composition of Comparative Example 1 was poor in adhesive property with a polyolefin base material like the PP plate, though the pressure-sensitive adhesive composition was excellent in haze and solution transparency.

Therefore, it is found that the polyester pressure-sensitive adhesive compositions of Examples 1 to 7 are each an excellent polyester pressure-sensitive adhesive composition that achieves both of an adhesive property with a polyolefin base material and transparency.

Although specific embodiments of the present disclosure have been described in Examples above. Examples are for illustrative purposes only and are not to be construed as limitative. It is intended that various modifications apparent to a person skilled in the art fall within the scope of the present disclosure.

The polyester pressure-sensitive adhesive composition of the present disclosure is excellent in adhesive property with a polyolefin base material that is generally poor in adhesive property, and is also excellent in transparency. Accordingly, the pressure-sensitive adhesive and the pressure-sensitive adhesive sheet each using the composition can each be suitably used in an application where, in a display and an optical member forming the display, such as an optical film or a base material, the optical member is bonded.

The invention claimed is:

1. A polyester pressure-sensitive adhesive composition, comprising a polyester resin having a structural unit derived from a hydrogenated polybutadiene structure-containing compound,
   wherein a content of the structural unit derived from the hydrogenated polybutadiene structure-containing compound is from 0.01 wt. % to 35 wt. % with respect to the polyester resin;
   wherein a weight-average molecular weight of the polyester resin is from 20000 to 200000; and
   wherein an acid value of the polyester resin is 3 mgKOH/g or less.

2. The polyester pressure-sensitive adhesive composition according to claim 1,
   wherein the polyester resin has
      a structural unit derived from a polyvalent carboxylic acid (a1) and
      a structural unit derived from a polyol (a2),
   wherein the hydrogenated polybutadiene structure-containing compound is a hydrogenated polybutadiene polyol in the polyol (a2), and
   wherein the structural unit derived from the hydrogenated polybutadiene structure-containing compound is incorporated at from 0.001 mol % to 10 mol % into the structural unit derived from the polyol (a2).

3. The polyester pressure-sensitive adhesive composition according to claim 2, wherein the polyvalent carboxylic acid (a1) comprises an asymmetric aromatic polyvalent carboxylic acid.

4. The polyester pressure-sensitive adhesive composition according to claim 2, wherein the polyvalent carboxylic acid (a1) comprises an aliphatic polyvalent carboxylic acid having an odd number of carbon atoms.

5. The polyester pressure-sensitive adhesive composition according to claim 2, wherein the polyol (a2) comprises a branched structure-containing polyol.

6. The polyester pressure-sensitive adhesive composition according to claim 2, wherein the polyol (a2) comprises a linear polyol.

7. The polyester pressure-sensitive adhesive composition according to claim 1, wherein the polyester resin has a glass transition temperature of from −80° C. to 20° C.

8. The polyester pressure-sensitive adhesive composition according to claim 1, further comprising a hydrolysis inhibitor.

9. The polyester pressure-sensitive adhesive composition according to claim 1, further comprising a urethanization catalyst.

10. The polyester pressure-sensitive adhesive composition according to claim 1, further comprising a crosslinking agent.

11. A polyester pressure-sensitive adhesive, which is obtained by crosslinking the polyester pressure-sensitive adhesive composition of claim 1.

12. A pressure-sensitive adhesive sheet, comprising a pressure-sensitive adhesive layer containing the polyester pressure-sensitive adhesive of claim 11.

13. An optical member with a pressure-sensitive adhesive layer, comprising:
   a pressure-sensitive adhesive layer containing the polyester pressure-sensitive adhesive of claim 11; and
   an optical member.

14. The polyester pressure-sensitive adhesive composition according to claim 1, wherein a content of the structural unit derived from the hydrogenated polybutadiene structure-containing compound is from 0.01 wt. % to 20 wt. %.

* * * * *